(12) United States Patent
Tsai et al.

(10) Patent No.: US 11,204,672 B2
(45) Date of Patent: *Dec. 21, 2021

(54) TOUCH PANEL AND MANUFACTURING METHOD THEREOF

(71) Applicant: Cambrios Film Solutions Corporation, Tortola (VG)

(72) Inventors: Yi-Chen Tsai, Chiayi (TW); Wei-Chia Fang, Zhubei (TW); Chun-Hung Chu, Hsinchu (TW); Jia-Xiang Wu, Taoyuan (TW); Chung-Chin Hsiao, Zhubei (TW)

(73) Assignee: CAMBRIOS FILM SOLUTIONS CORPORATION, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/998,301

(22) Filed: Aug. 20, 2020

(65) Prior Publication Data
US 2021/0157448 A1 May 27, 2021

(30) Foreign Application Priority Data
Nov. 26, 2019 (CN) .......................... 201911176530.0

(51) Int. Cl.
*G06F 3/041* (2006.01)
*G06F 3/044* (2006.01)

(52) U.S. Cl.
CPC .. *G06F 3/0443* (2019.05); *G06F 2203/04103* (2013.01)

(58) Field of Classification Search
None
See application file for complete search history.

(56) References Cited

U.S. PATENT DOCUMENTS

| 2014/0022467 | A1* | 1/2014 | Chai | G06F 3/0445 349/12 |
| 2020/0012372 | A1* | 1/2020 | Chang | G06F 3/0412 |
| 2020/0097113 | A1* | 3/2020 | Fang | G06F 3/0443 |
| 2020/0319751 | A1* | 10/2020 | Yu | G06F 3/0443 |

* cited by examiner

*Primary Examiner* — Duane N Taylor, Jr.
(74) *Attorney, Agent, or Firm* — Cooper Legal Group, LLC

(57) ABSTRACT

A touch panel and a manufacturing method thereof are provided. The touch panel includes a substrate, peripheral leads, a touch sensing electrode, and first intermediate layers. The peripheral leads are disposed in a peripheral area of the substrate. The first intermediate layers are disposed between the peripheral leads and the substrate. The touch sensing electrode includes a plurality of modified metal nanowires. The modified metal nanowires have first surfaces in direct contact with each other at an intersection. The modified metal nanowires have second surfaces with covering structures, and the second surfaces are at a non-intersection.

8 Claims, 22 Drawing Sheets

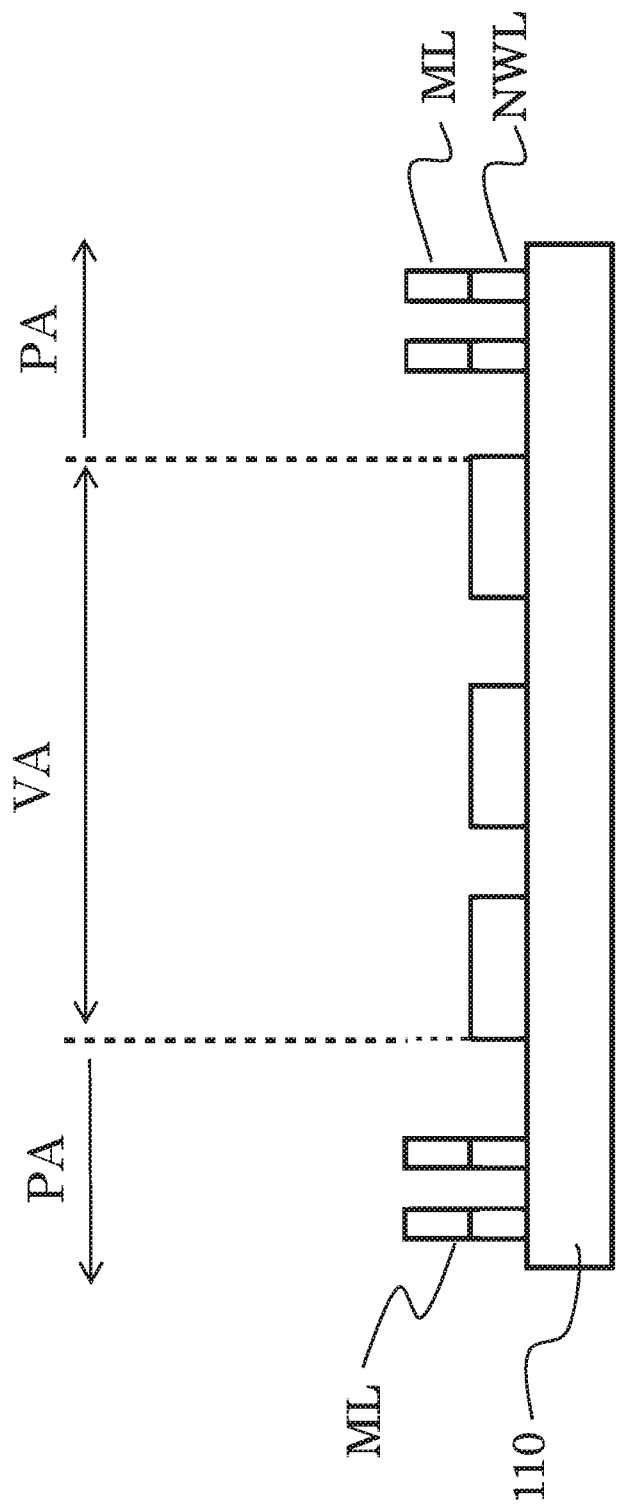

TOUCH PANEL AND MANUFACTURING METHOD THEREOF

CROSS-REFERENCE TO RELATED APPLICATION

This application claims priority to China Application Serial Number 201911176530.0, filed Nov. 26, 2019, which is herein incorporated by reference.

BACKGROUND

Field of Disclosure

The present disclosure relates to a touch panel and a manufacturing method thereof.

Description of Related Art

In recent years, transparent conductors can allow light to pass through while providing proper conductivity, so they are often used in many display or touch-related devices. The transparent conductor may generally be various metal oxides, such as indium tin oxide (ITO), indium zinc oxide (IZO), cadmium tin oxide (CTO), or aluminum-doped zinc oxide (AZO). However, these metal oxides cannot meet the flexibility requirements of display devices. Therefore, a variety of flexible transparent conductors, such as transparent conductors made of materials such as nanowires, have been developed now.

However, there are still many problems to be solved in manufacturing the nanowires. For example, silver nanowires have high conductivity, but a high reflectivity of a silver material causes an optical influence. It has been proposed in some studies to plate the surface of silver nanowires with a low reflectivity material to achieve higher optical characteristics. However, the low reflectivity material plated onto the surface of the silver nanowires leads to higher resistance on a silver wire lap joint. That is, although optical properties can be improved by plating the low reflectivity material, the electrical advantage is damaged. As another example, a touch electrode is made of nanowires. When the nanowires are aligned with leads in a peripheral area, an alignment error area needs to be reserved. The alignment error area makes it impossible to reduce the sizes of the leads in the peripheral area, resulting in a larger width of the peripheral area. In particular, when a roll-to-roll process is adopted, a deformation of a substrate makes the size of the alignment error area larger (for example, 150 μm), so the minimum width of the peripheral area is only 2.5 mm, which cannot meet the requirements for a narrow bezel of a display.

SUMMARY

In some embodiments of the present disclosure, a covering structure is formed on specific surfaces (surfaces not in contact with one another) of metal nanowires to achieve an objective of improving optical characteristics, while maintaining electrical characteristics of an electrode composed of the metal nanowires.

In some embodiment of the present disclosure, by designing a first intermediate layer formed by at least the metal nanowires between peripheral leads and a substrate, the peripheral leads and the substrate are formed by the same etching step, so as to achieve the effect that there is no need to reserve an alignment error area during alignment, so as to form the peripheral leads with a smaller width, thereby meeting the requirements for a narrow bezel.

According to some embodiments of the present disclosure, a touch panel includes a substrate, wherein the substrate has a display area and a peripheral area; a plurality of peripheral leads disposed in the peripheral area of the substrate; a plurality of first intermediate layers disposed between the peripheral leads and the substrate; and a touch sensing electrode disposed in the display area of the substrate and electrically connected with the peripheral leads, wherein the touch sensing electrode includes a plurality of modified metal nanowires, the modified metal nanowires have first surfaces in direct contact with each other at an intersection, the modified metal nanowires have second surfaces with covering structures, and the second surfaces are at a non-intersection.

In some embodiments of the present disclosure, the first intermediate layers include the modified metal nanowires.

In some embodiments of the present disclosure, the first intermediate layers include a plurality of unmodified metal nanowires, and outer surfaces of the peripheral leads are each provided with the covering structure.

In some embodiments of the present disclosure, the touch panel further includes: a film layer, wherein the modified metal nanowires are exposed on the film layer.

In some embodiments of the present disclosure, the touch sensing electrode further includes a plurality of unmodified metal nanowires disposed in the film layer.

In some embodiments of the present disclosure, the covering structures are at least one of layered structures, island-shaped protrusion structures, or point-shaped protrusion structures which are made of a conductive material.

In some embodiments of the present disclosure, the conductive material is silver, gold, platinum, iridium, rhodium, palladium, or osmium.

In some embodiments of the present disclosure, the conductive material is graphene, carbon nanotubes, conductive polymers, or conductive oxides.

According to some embodiments of the present disclosure, a method for manufacturing a touch panel, includes: providing a substrate having a display area and a peripheral area; disposing a plurality of unmodified metal nanowires in the display area and the peripheral area, wherein the unmodified metal nanowires have first surfaces in direct contact with each other at an intersection, and the unmodified metal nanowires each have a second surface at a non-intersection; conducting a modification process to form a metal nanowire layer composed of a plurality of modified metal nanowires, wherein the second surface of each of the modified metal nanowires has a covering structure; disposing a metal layer in the peripheral area; and conducting a patterning process, including: patterning the metal nanowire layer located in the display area to form a touch sensing electrode, wherein the touch sensing electrode includes the modified metal nanowires.

In some embodiments of the present disclosure, the conducting a patterning process further includes: patterning the metal layer and metal nanowire layer located in the peripheral area at a same time, wherein the patterned metal layer forms a plurality of peripheral leads, the patterned metal nanowire layer forms a plurality of first intermediate layers, and the first intermediate layers are disposed between the peripheral leads and the substrate.

In some embodiments of the present disclosure, the first intermediate layers include the modified metal nanowires.

In some embodiments of the present disclosure, the disposing the plurality of unmodified metal nanowires in the display area and the peripheral area further includes: disposing a film layer on the unmodified metal nanowires, wherein an exposed part of the unmodified metal nanowires is exposed on the film layer, the exposed part forms the modified metal nanowires through the modification process, an unexposed part of the unmodified metal nanowires is embedded in the film layer, and the unexposed part is not affected by the modification process.

In some embodiments of the present disclosure, the modification process includes coating, chemical plating, electroplating, or sputtering to form the covering structure, and the covering structure is at least one of a layered structure, an island-shaped protrusion structure, or a point-shaped protrusion structure which is made of a conductive material.

In some embodiments of the present disclosure, marks include docking alignment marks.

According to some embodiments of the present disclosure, a method for manufacturing a touch panel, includes: providing a substrate having a display area and a peripheral area; disposing a metal nanowire layer composed of a plurality of unmodified metal nanowires in the display area and the peripheral area, wherein the unmodified metal nanowires have first surfaces in direct contact with each other at an intersection, and the unmodified metal nanowires each have a second surface at a non-intersection; disposing a metal layer in the peripheral area; conducting a patterning process, including: patterning the metal nanowire layer located in the display area to form a touch sensing electrode; and conducting a modification process to form a plurality of modified metal nanowires, wherein the touch sensing electrode includes the modified metal nanowires, and the second surface of each of the modified metal nanowires has a covering structure.

In some embodiments of the present disclosure, the conducting a modification process further includes: patterning the metal layer and metal nanowire layer located in the peripheral area at a same time, wherein the patterned metal layer forms a plurality of peripheral leads, the patterned metal nanowire layer forms a plurality of first intermediate layers, and the first intermediate layers are disposed between the peripheral leads and the substrate.

In some embodiments of the present disclosure, the first intermediate layers include the unmodified metal nanowires.

In some embodiments of the present disclosure, the conducting the modification process further includes: forming the covering structure on outer surfaces of the peripheral leads.

In some embodiments of the present disclosure, disposing the metal nanowire layer composed of the plurality of unmodified metal nanowires in the display area and the peripheral area includes: disposing a film layer on the unmodified metal nanowires, wherein an exposed part of the unmodified metal nanowires is exposed on the film layer, an unexposed part of the unmodified metal nanowires is embedded in the film layer, the exposed part located in the display area forms the modified metal nanowires through the modification process; and the unexposed part located in the display area is not affected by the modification process.

In some embodiments of the present disclosure, the exposed part located in the peripheral area is covered by the peripheral leads and is not affected by the modification process; and the unexposed part located in the peripheral area is not affected by the modification process.

In some embodiments of the present disclosure, the conducting a modification process further includes: forming the covering structure on outer surfaces of the peripheral leads.

In some embodiments of the present disclosure, the touch sensing electrode or an etching layer (for example, a first intermediate layer/second intermediate layer) is composed of modified metal nanowires.

In some embodiments of the present disclosure, the touch sensing electrode is composed of modified exposed metal nanowires and a composite structure composed of unmodified metal nanowires and a film layer.

In some embodiments of the present disclosure, the etching layer (for example, the first intermediate layer/second intermediate layer) is composed of modified exposed metal nanowires and a composite structure composed of unmodified metal nanowires and a film layer.

In some embodiments of the present disclosure, the etching layer (for example, the first intermediate layer/second intermediate layer) is composed of a composite structure composed of unmodified metal nanowires and a film layer, the peripheral leads are disposed on the etching layer, and outer surfaces of the peripheral leads each have a covering structure.

In some embodiments of the present disclosure, the etching layer (for example, the first intermediate layer/second intermediate layer) is composed of unmodified exposed metal nanowires and a composite structure composed of unmodified metal nanowires and a film layer, the peripheral leads are disposed on the etching layer, and outer surfaces of the peripheral leads each have a covering structure.

BRIEF DESCRIPTION OF THE DRAWINGS

FIGS. 4A to 4D are schematic views of a method for manufacturing a touch panel according to another embodiment of the present disclosure;

DETAILED DESCRIPTION

Figure 1:
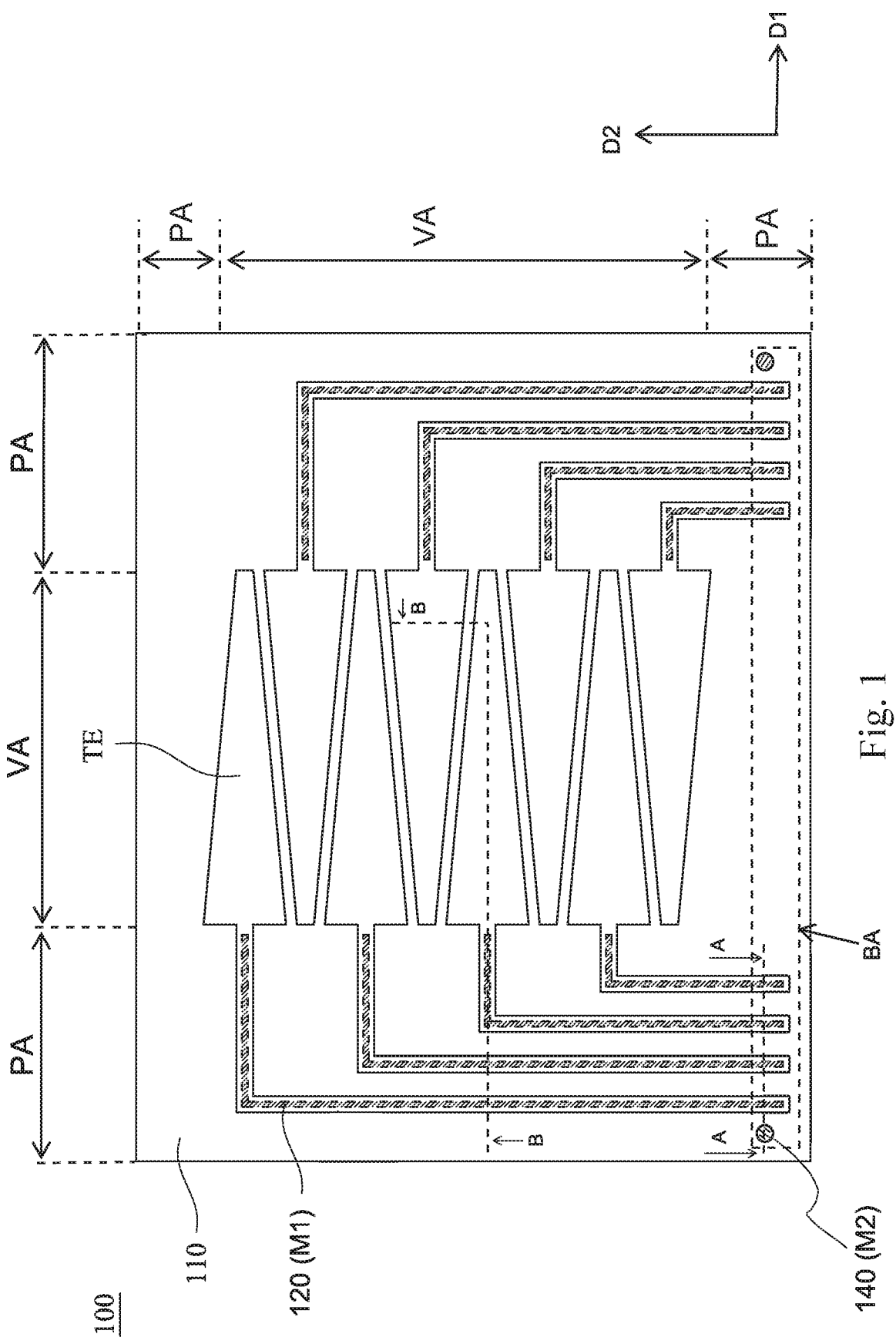
FIG. 1 is a schematic top view of a touch panel according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

A plurality of embodiments of the present disclosure will be disclosed hereafter through the drawings. For the sake of clarity, many practical details will be explained in the following description. However, it should be understood that these practical details should not be used to limit the present disclosure. That is, in some embodiments of the present disclosure, these practical details are unnecessary. In addition, for the sake of simplifying the drawings, some conventional structures and components will be shown in a simple schematic manner in the drawings.

As used herein, "about", "approximately" or "roughly" generally means that the error or range of a numeric value is within 20%, preferably within 10%, and more preferably within 5%. Unless explicitly stated in the text, all values mentioned are regarded as approximate values (i.e., with errors or ranges expressed as "about", "approximately" or "roughly").

Figure 1A:
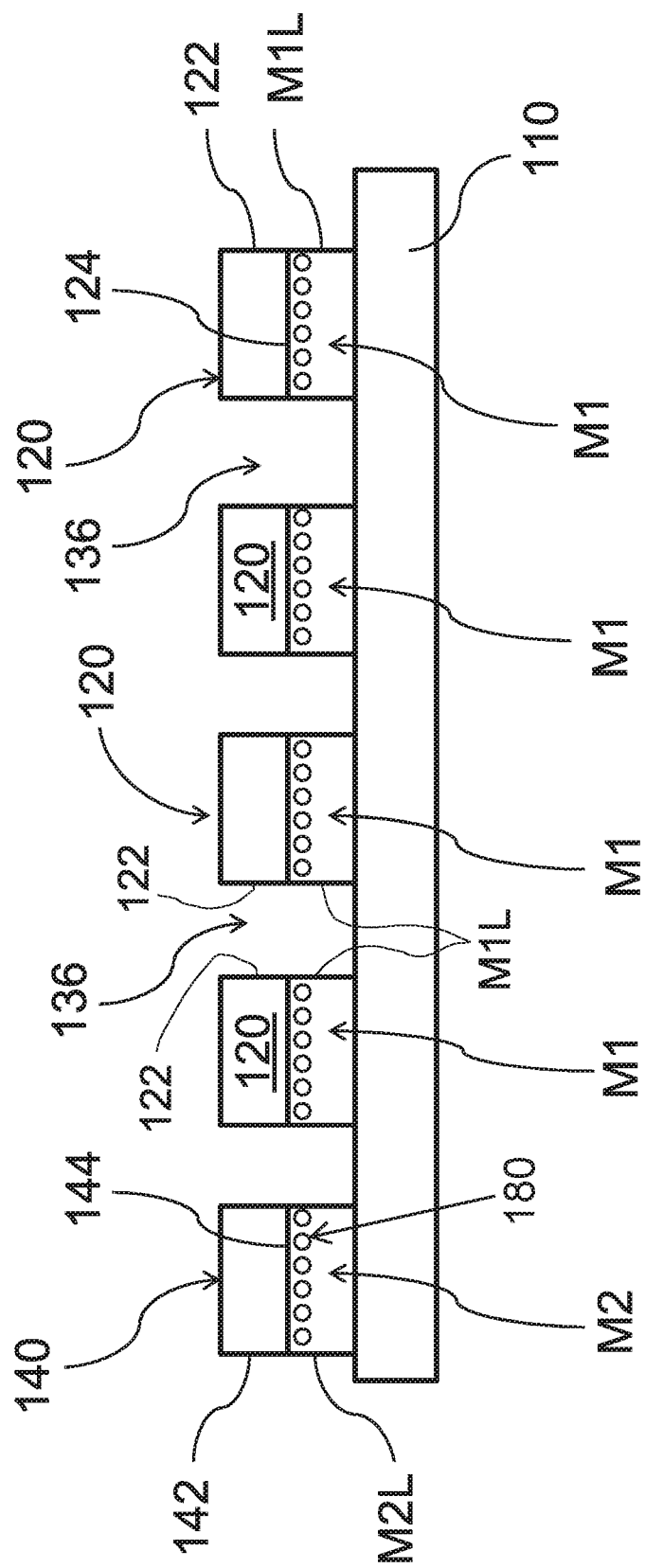
FIG. 1A is a schematic cross-sectional view taken along a line A-A of FIG. 1.
Figure 1B:
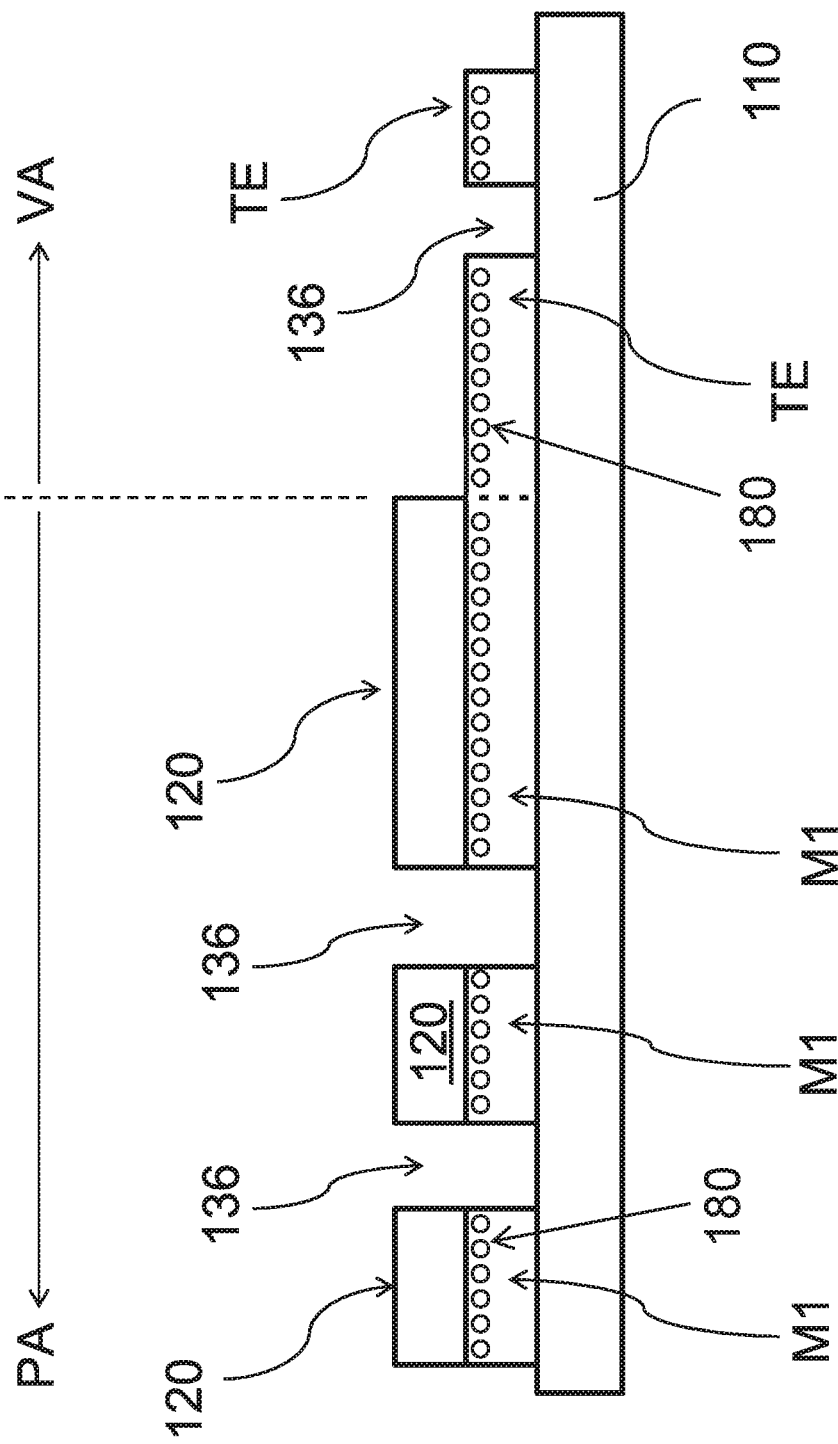
FIG. 1B is a schematic cross-sectional view taken along a line B-B of FIG. 1.

A touch panel 100 according to some embodiments of the present disclosure includes a substrate 110, peripheral leads 120, first intermediate layers M1, and a touch sensing electrode TE, wherein the touch sensing electrode TE includes a plurality of modified metal nanowires 190. The modified metal nanowires 190 each have a first surface 191 in direct contact with a first surface of another modified metal nanowire at an intersection; and the modified metal nanowires 190 have second surfaces 192 with covering structures 180, the second surfaces 192 are at a non-intersection (refer to FIG. 2B first). FIG. 1 is a schematic top view of a touch panel 100 according to some embodiments of the present disclosure. Referring to FIG. 1 to FIG. 1B, the touch panel 100 may include a substrate 110, peripheral leads 120, a mark 140, first intermediate layers M1, second intermediate layers M2, and a touch sensing electrode TE. The first intermediate layers M1 are disposed between the peripheral leads 120 and the substrate 110, and the second intermediate layers M2 are disposed between the mark 140 and the substrate 110. The touch sensing electrode TE is roughly located in a display area VA and is patterned by a metal nanowire layer NWL composed of a plurality of modified metal nanowires 190. The modified metal nanowires 190 each have a first surface 191 in direct contact with a first surface of another modified metal nanowire at an intersection; and the modified metal nanowires 190 have second surfaces 192 with covering structures 180, and the second surfaces 192 are at a non-intersection. The covering structure 180 is formed on the surfaces (surfaces at the non-intersection) of the metal nanowires 190, so that the light reflection of the metal nanowires 190 can be reduced or avoided to improve the haze of the touch panel 100. In addition, intersections of the metal nanowires 190 are in direct contact with one another. In other words, the covering structure 180 is not formed on the contact surfaces of the metal nanowires 190, so the low resistance characteristics of a conductive network composed of the metal nanowires 190 can be maintained. For convenience of depiction, the touch sensing electrode TE, the first intermediate layers M1, and the second intermediate layer M2 shown in FIGS. 1A and 1B are each depicted as having a covering structure 180, representing that the touch sensing electrode TE, the first intermediate layers M1, and the second intermediate layer M2 are all composed of modified metal nanowires 190.

In addition, the first intermediate layers M1 and the second intermediate layer M2 may be each composed of metal nanowires 190 layers of unmodified or modified metal nanowires 190 according to different processes, such as unmodified or modified silver nanowires layers, unmodified or modified gold nanowires layers, or unmodified or modified copper nanowires.

There may be one or more peripheral leads 120, one or more marks 140, one or more first intermediate layers M1, one or more second intermediate layers M2, and one or more touch sensing electrodes TE. The number of elements drawn in the following specific embodiments and drawings are for illustration only and do not limit the present disclosure. Referring to FIG. 1, the substrate 110 has a display area VA and a peripheral area PA, and the peripheral area PA is arranged at a side of the display area VA. For example, the peripheral area PA can be a frame-shaped area arranged around the display area VA (namely covering the right, left, upper, and lower sides), but in other embodiments, the peripheral area PA can be an L-shaped area arranged at the left and lower sides of the display area VA. As shown in FIG. 1, in this embodiment, there are eight groups of peripheral leads 120 and first intermediate layers M1 corresponding to the peripheral leads 120, both of which are disposed in the peripheral area PA of the substrate 110. The touch sensing electrode TE is disposed in the display area VA of the substrate 110 and electrically connected to the peripheral leads 120. This embodiment further has two groups of marks 140, and second intermediate layers M2 corresponding to the marks 140 are disposed in the peripheral area PA of the substrate 110. The first intermediate layers M1 are disposed between the peripheral leads 120 and the substrate 110 or the second intermediate layers M2 are disposed between the marks 140 and the substrate 110, so that upper and lower layers of materials can be formed at predetermined positions without alignment. Therefore, this arrangement can reduce or avoid requirements related to setting an alignment error area in a process and can reduce a width of the peripheral area PA, thereby meeting requirements for a narrow bezel of a display.

Figure 2A:
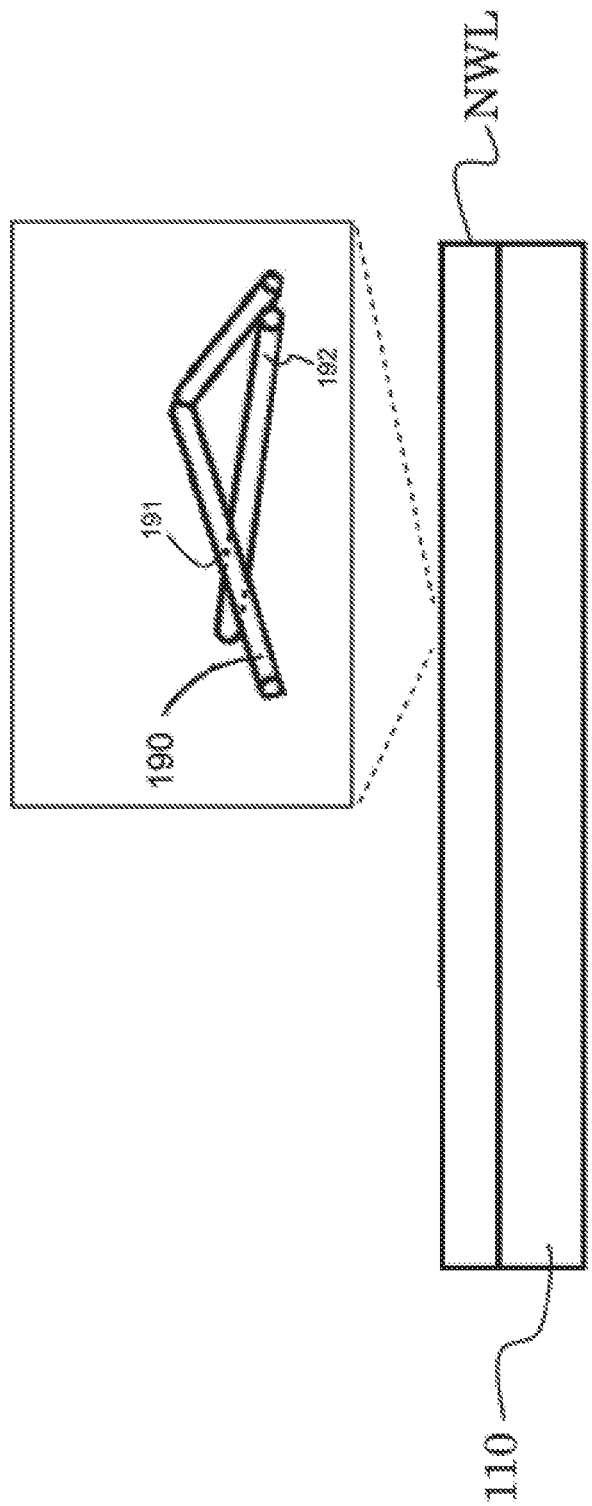
FIGS. 2A to 2D are schematic views of a method for manufacturing a touch panel according to some embodiments of the present disclosure.
Figure 2B:
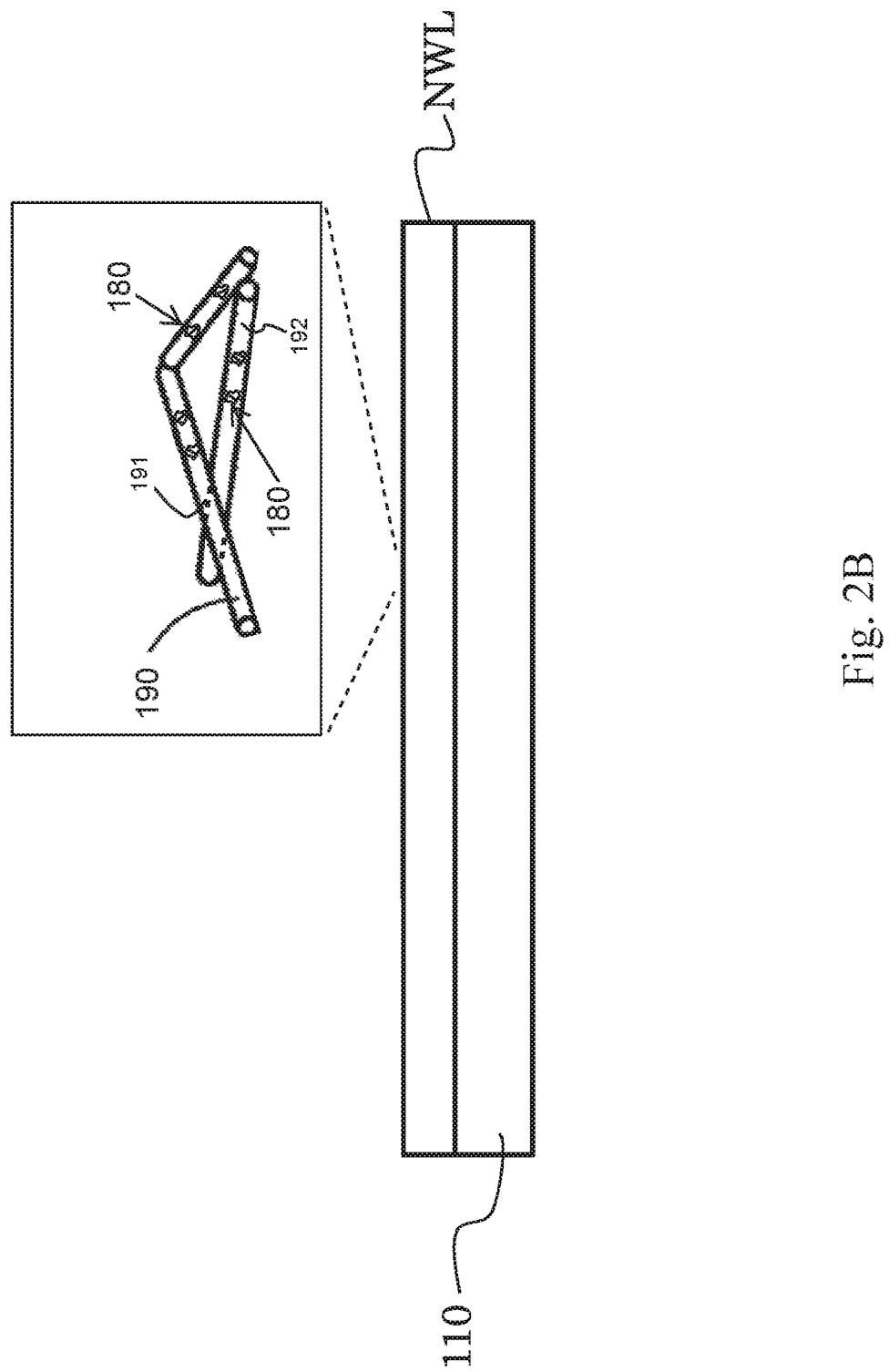
Figure 2C:
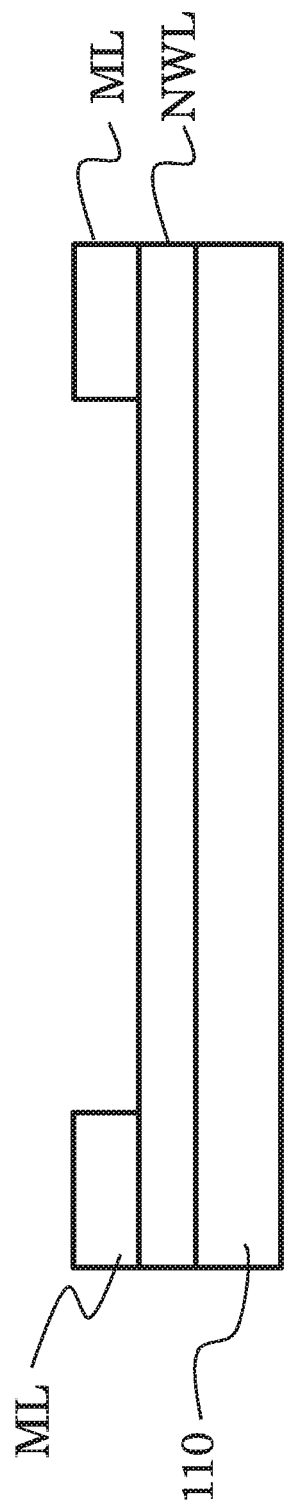
Figure 2D:
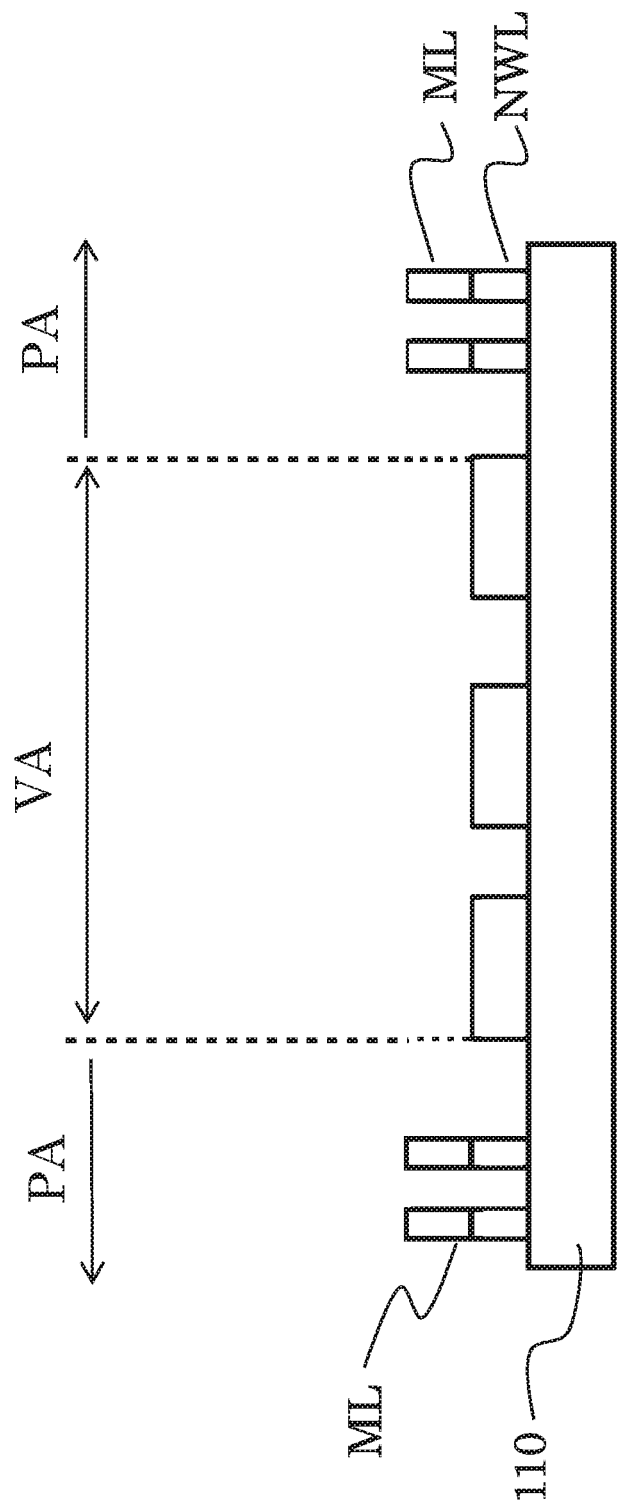

Referring to FIGS. 2A to 2D, which show a method for manufacturing the foregoing touch panel 100: first, a substrate 110 is provided, which has a predefined peripheral area PA and display area VA. Next, unmodified metal nanowires 190 are disposed on the substrate 110 to form a metal nanowire layer NWL in the peripheral area PA and the display area VA (as shown in FIG. 2A). The metal nanowires 190 each have a first surface 191 in direct contact with a first surface of another metal nanowire at an intersection and a second surface 192 at a non-intersection. Then, a modification step is conducted, and a covering structure 180 is formed on the second surface 192 of each of the modified metal nanowires 190 at one non-intersection (as shown in FIG. 2B). Then, a metal layer ML is formed in the peripheral area PA (as shown in FIG. 2C). Then, patterning is implemented to form a patterned metal layer ML and a metal nanowire layer NWL (as shown in FIG. 2D), wherein the metal nanowire layer NWL located in the display area VA is patterned to form a touch sensing electrode TE (with reference to FIGS. 1 and 1B), and the touch sensing electrode TE is composed of the modified metal nanowires 190 due to the foregoing modification step.

The foregoing steps will be described in more detail hereafter.

Referring to FIG. 2A, first, a metal nanowire layer NWL including at least metal nanowires 190, such as a silver nanowire layer, a gold nanowire layer, or a copper nanowire layer, is coated into a peripheral area PA and a display area VA of a substrate 110. A first part of the metal nanowire layer NWL is mainly located in the display area VA, while a second part is mainly located in the peripheral area PA. In this embodiment, the method is specifically as follows: a dispersion or ink with metal nanowires 190 is formed on the substrate 110 in a coating mode and dried to make the metal nanowires 190 cover the surface of the substrate 110, thereby forming a metal nanowire layer NWL disposed on the substrate 110. After the foregoing curing/drying step, solvents and other substances are volatilized, and the metal nanowires 190 are randomly distributed on the surface of the substrate 110. Preferably, the metal nanowires 190 are fixed on the surface of the substrate 110 without falling off to form the metal nanowire layer NWL, and the metal nanowires 190 can be in contact with one another to provide a continuous current path, thereby forming a conductive network. In other words, the first surfaces 191 of the metal nanowires 190 at intersection positions are in contact with one another to form a path for transmitting electrons. Taking silver nanowires as an example, one silver nanowire and another silver nanowire form a direct contact state at an intersection position (the first surface 191 is the silver-silver contact interface), thus forming a low-resistance electron transmission path. The subsequent modification operation will not affect or change the low-resistance structure of "silver-silver contact", so the modification operation will not have a negative impact on the electrical characteristics of an end product. In an embodiment, when the sheet resistance of an area or a structure is higher than 108 ohm/square, the area or the structure can be considered as electrical insulation, and the sheet resistance is preferably higher than 104 ohm/square, 3000 ohm/square, 1000 ohm/square, 350 ohm/square, or 100 ohm/square.

In an embodiment of the present disclosure, the foregoing dispersion may be water, alcohol, ketone, ether, hydrocarbon, or aromatic solvent (benzene, toluene, xylene, etc.). The foregoing dispersion may also include additives, surfactants, or binders, such as carboxymethyl cellulose (CMC), 2-hydroxyethyl cellulose (HEC), hydroxypropyl methylcellulose (HPMC), sulfonate, sulfate, disulfonate, sulfosuccinate, phosphate, or fluorine-containing surfactant, etc. The dispersion or ink including the metal nanowires 190 can be formed on the surface of the substrate 110 to form the metal layer ML in any way, such as but not limited to screen printing, spray coating, and roller coating. In an embodiment, the dispersion or ink including the metal nanowires 190 can be coated onto the surfaces of continuously supplied substrates 110 and the foregoing metal layer ML is formed by a roll-to-roll (RTR) process.

As used herein, "metal nanowires" is a collective noun, which refers to a collection of metal wires including multiple elemental metals, metal alloys, or metal compounds (including metal oxides), wherein the number of metal nanowires included does not affect the scope of protection claimed by the present disclosure. At least one cross-sectional dimension (i.e., the diameter of the cross section) of a single metal nanowire is less than about 500 nm, preferably less than about 100 nm, and more preferably less than about 50 nm. A metal nanostructure referenced as a "wire" in the present disclosure mainly has a high aspect ratio, for example, between about 10 and 100,000. More specifically, the aspect ratio (length:diameter of the cross section) of the metal nanowire can be greater than about 10, preferably greater than about 50, and more preferably greater than about 100. The metal nanowires can be any metal, including (but not limited to) silver, gold, copper, nickel, and gold-plated silver. Other terms, such as silk, fiber and tube (e.g., carbon nanotube), if also having the foregoing dimensions and high aspect ratios, shall also fall within the scope covered by the present disclosure.

Referring to FIG. 2B, a modification step is implemented to form a metal nanowire layer NWL composed of a plurality of modified metal nanowires 190. That is, after modification, at least a part of the initial metal nanowires 190 in the metal nanowire layer NWL is modified to form a covering structure 180 on its surface to form the modified metal nanowires 190. In a specific embodiment, the covering structure 180 can be formed by coating, chemical plating, electroplating, or sputtering, and the covering structure 180 may be a layered structure, an island-shaped protrusion structure, a point-shaped protrusion structure which are made of a conductive material or a combination thereof. A coating rate is about 0.1-10% of the total surface area. The foregoing conductive material may be silver, gold, platinum, copper, iridium, rhodium, palladium, osmium, or the like, or is graphene, carbon nanotubes, conductive polymers (such as poly(3,4-ethylenedioxythiophene) polystyrene sulfonate (PEDOT:PSS)) or conductive oxides (such as ITO), or the like. In a specific embodiment, the following solution can be prepared to deposit palladium on the metal nanowire 190 to form the covering structure 180. The solution includes palladium precursors such as, but not limited to, $PdSO_4$, $PdCl_2$, $Pd(NO_3)_2$, $Pd(SCN)_2$, which are dissolved in acidic/neutral/alkaline solvents such as sulfuric acid, nitric acid, NaOH, $NaH_2PO_2$, $KIO_3$ and ethylenediamine. The solution may include a little stabilizer, reducing agent, or chelating agent.

It should be noted that the modification step is implemented after a film of the metal nanowire layer NWL is formed. After the film formation, the metal nanowires 190 have substantially formed a lap joint state in which the metal nanowires 190 are in contact with one another. That is, a surface (i.e., a first surface 191) of one metal nanowire 190 has been in direct contact with a first surface 191 of another metal nanowire 190, so the covering structure 180 formed by the modification step is not formed on the first surface 191, but selectively formed on another exposed surface (i.e., a second surface 192). Accordingly, the covering structure 180 formed by the modification step does not have a negative influence on a conductive path formed by lap joint, thereby maintaining a low-resistance transmission path formed by the metal nanowires 190.

Referring to FIG. 2C, a metal layer ML is formed in the peripheral area PA of the substrate 110, and the metal layer ML can be subsequently patterned into peripheral leads 120. In detail, in some embodiments of the present disclosure, the metal layer ML can be made of a metal with better conductivity and preferably has a single-layer metal structure, such as a silver layer or a copper layer, or a multilayer conductive structure, such as molybdenum/aluminum/molybdenum, copper/nickel, titanium/aluminum/titanium, or molybdenum/chromium. The metal structure is preferably opaque (e.g., the light transmission for visible light (e.g., with a wavelength of 400-700 nm) is less than about 90%).

In this embodiment, the metal can be formed on the metal nanowire layer NWL by sputtering (such as, but not limited to, physical sputtering and chemical sputtering). The metal layer ML can be directly and selectively formed in the peripheral area PA but not in the display area VA or can be entirely formed in the peripheral area PA and the display area VA first, and then the metal layer ML located in the display area VA is removed by etching and other steps.

In an embodiment, the metal layer ML is deposited in the peripheral area PA of the substrate 110 by chemical plating such that the metal layer is located on a second part of the metal nanowire layer NWL. The chemical plating is to reduce, by means of a suitable reducing agent without an external current, metal ions in a plating solution into a metal under the catalysis of a metal catalyst and plate the metal onto the surface of the substrate 110. This process is called electroless plating and is also called chemical plating or autocatalytic plating. Therefore, the metal layer ML in this embodiment may also be called an electroless plating layer, a chemical plating layer, or an autocatalytic plating layer. Specifically, for example, a plating solution whose main component is copper sulfate can be used, and the plating solution may include, but is not limited to, copper sulfate with a concentration of 5 g/L, ethylenediaminetetraacetic acid with a concentration of 12 g/L, and formaldehyde with a concentration of 5 g/L. The pH of the electroless copper plating solution is adjusted to about 11-13 with sodium hydroxide, a plating bath is performed at about 50-70° C., and the soaking reaction is performed for 1-5 min. In an embodiment, a catalytic layer (not shown) may be formed on the second part of the metal nanowire layer NWL. Since the first part of the metal nanowire layer NWL in the display area VA has no catalytic layer, the copper layer is deposited only in the peripheral area PA but not formed in the display area VA. During the electroless plating reaction, the copper material can nucleate on the catalytic layer with catalytic/activation ability, and then a copper film can continue to grow by the self-catalysis of copper. In an embodiment, a copper layer is deposited in the peripheral area PA of the substrate 110 by sputtering such that the copper layer is located on the second part of the metal nanowire layer NWL.

Next, patterning is implemented, as shown in FIG. 2D. After the patterning step, the metal nanowire layer NWL formed by the modified metal nanowires 190 in the display area VA is patterned to form an electrode structure. Similarly, the metal nanowire layer NWL and the metal layer ML in the peripheral area PA are also patterned to form an electrode structure. The electrode structures in the two areas constitute an electrode group applicable to touch sensing.

In an embodiment, an etching solution capable of simultaneously etching the metal nanowire layer NWL and the metal layer ML including the modified metal nanowires 190 is used in the peripheral area PA. The etching solution is used by combining with an etching mask (such as photoresist) to fabricate the patterned metal layer ML and the patterned metal nanowire layer NWL at the same time in the same process. As shown in FIG. 2D, in conjunction with FIGS. 1 and 1A, the patterned metal layer ML fabricated in the peripheral area PA is peripheral leads 120, and the patterned metal nanowire layer NWL constitutes an etching layer. Since the etching layer in this embodiment is located between the peripheral leads 120 and the substrate 110, the etching layer can also be called a first intermediate layer M1. In other words, after the patterning step, the first intermediate layer M1 composed of the second part of the metal nanowire layer NWL and the peripheral leads 120 composed of the metal layer ML are formed in the peripheral area PA.

In another embodiment, an etching layer composed of the second part of the metal nanowire layer NWL, the peripheral leads 120 composed of the metal layer ML, and marks 140 can be fabricated in the peripheral area PA (referring to FIGS. 1, 1A and 1B). The etching layer may include a first intermediate layer M1 and a second intermediate layer M2. The first intermediate layer M1 is disposed between the corresponding peripheral leads 120 and the substrate 110, and the second intermediate layer M2 is disposed between the corresponding marks 140 and the substrate 110. In an embodiment, etching the metal nanowire layer NWL and the metal layer ML simultaneously means that a ratio of an etching rate for the metal nanowire layer NWL to an etching rate for the metal layer ML is about 0.1-10 or 0.01-100.

According to a specific embodiment, the metal nanowire layer NWL is composed of silver nanowires, the surface thereof on a non-intersection has a palladium covering structure 180, and the metal layer ML is a copper layer. In this case, an etching solution may have components capable of etching copper and silver. For example, the main components of the etching solution are $H_3PO_4$ (with a proportion of about 55 vol. %-70 vol. %) and $HNO_3$ (with a proportion of about 5 vol. %-15 vol. %), so as to remove the copper material and the silver material in the same process. In another embodiment, an additive, such as an etching selection ratio modifier, may be added to main components of the etching solution, so as to adjust rates of copper etching and silver etching. For example, about 5 vol. %-10 vol. % of benzotriazole (BTA) can be added to the main components $H_3PO_4$ (with a proportion of about 55 vol. %-70 vol. %) and $HNO_3$ (with a proportion of about 5 vol. %-15 vol. %) to solve the problem of copper over-etching. In another specific embodiment, the main components of the etching solution are ferric chloride/nitric acid, or phosphoric acid/hydrogen peroxide, etc.

The patterning step may further include: patterning the metal nanowire layer NWL in the display area VA at the same time. In other words, as shown in FIG. 2D, the first part of the metal nanowire layer NWL in the display area VA can be patterned using the foregoing etching solution by combining an etching mask (e.g., photoresist) so as to fabricate a touch sensing electrode TE of this embodiment in the display area VA, and the touch sensing electrode TE can be electrically connected to the peripheral leads 120. Specifically, the touch sensing electrode TE may include the metal nanowire layer NWL including at least the modified metal nanowires 190. On the whole, the patterned metal nanowire layer NWL forms a touch sensing electrode TE in the display area VA while forming a first intermediate layer M1 in the peripheral area PA, so that the touch sensing electrode TE can be electrically connected by contacting the first intermediate layer M1 with the peripheral leads 120 for signal transmission. In this embodiment, the metal nanowire layer NWL can also form a second intermediate layer M2 in the peripheral area PA. The second intermediate layer M2 is disposed between the marks 140 and the substrate 110. The marks 140 can each be widely interpreted as a pattern having no electrical function, but is not limited thereto. In some embodiments of the present disclosure, the peripheral leads 120 and the marks 140 may be made of the same metal layer ML (i.e., the two are made of the same metal material, such as the foregoing chemical copper plating layer or copper sputtering layer). The touch sensing electrode TE, the first intermediate layer M1, and the second intermediate layer M2 can be made of the same metal nanowire layer NWL. For clear description, the touch sensing electrode TE, the first intermediate layers M1, and the second intermediate layer M2 shown in FIGS. 1A and 1B each have shown a covering structure 180, representing that the touch sensing electrode TE, the first intermediate layer M1, and the second intermediate layer M2 are all composed of modified metal nanowires 190.

In a variant embodiment, the metal nanowire layer NWL located in the display area VA and the peripheral area PA can be patterned by different etching steps (i.e., using different etching solutions). For example, when the metal nanowire layer NWL is a nano silver layer and the metal layer ML is a copper layer, the etching solution used in the display area VA can be an etching solution capable of etching only silver. For example, the etching rate of the selected etching solution for silver is about 100 times, about 1000 times, or about 10000 times higher than that for copper.

The touch panel 100 shown in FIG. 1 to FIG. 1B can be manufactured by the foregoing steps. For example, the patterned metal nanowire layer NWL in the display area VA constitutes the touch sensing electrode TE of the touch panel 100. The patterned metal layer ML in the peripheral area PA constitutes the peripheral leads 120 of the touch panel 100, the patterned metal nanowire layer NWL constitutes an etching layer (such as the first intermediate layer M1), and the peripheral leads 120 and the etching layer constitute a conductive circuit of the peripheral area PA for connection with an external controller.

In this embodiment, the first intermediate layer M1 and the second intermediate layer M2 may be composed of a metal nanowire layer NWL including at least modified metal nanowires 190, such as a modified silver nanowire layer, a modified gold nanowire layer, or a modified copper nanowire layer.

In this embodiment, the touch sensing electrode TE is disposed in the display area VA and can be electrically connected to the peripheral leads 120. Specifically, the touch sensing electrode TE can also be a metal nanowire layer NWL including at least modified metal nanowires 190. That is, the metal nanowire layer NWL forms a touch sensing electrode TE in the display area VA while forming a first intermediate layer M1 in the peripheral area PA, so that the touch sensing electrode TE can be electrically connected by contacting the first intermediate layer M1 with the peripheral leads 120 for signal transmission.

The metal nanowires 190 can also form a second intermediate layer M2 in the peripheral area PA. The second intermediate layer M2 is disposed between the marks 140 and the substrate 110. The marks 140 can each be widely interpreted as a pattern having no electrical function, but is not limited thereto. In some embodiments of the present disclosure, the peripheral leads 120 and the marks 140 may be made of the same metal layer (i.e., the two are made of the same metal material). The touch sensing electrode TE, the first intermediate layer M1, and the second intermediate layer M2 can be made of the same metal nanowire layer.

FIGS. 1A and 1B are cross-sectional views taken along a line A-A and a line B-B of FIG. 1, respectively. Refer to FIG. 1A first. As shown in FIG. 1A, the first intermediate layer M1 is formed by the modified metal nanowire 190 and disposed on a lower surface 124 of the peripheral lead 120, and the first intermediate layer M1 is located between the lower surface 124 and the substrate 110. The second intermediate layer M2 is formed by the modified metal nanowires 190 and disposed on a lower surface 144 of the mark 140, and the second intermediate layer M2 is located between the lower surface 144 and the substrate 110. In some embodiments of the present disclosure, the metal nanowires 190 may be silver nanowires. For convenience of explanation, the cross sections of the peripheral lead 120 and the mark 140 are each a quadrangle (e.g., a rectangle drawn in FIG. 1A) herein, but the structural types or numbers of side faces 122 and lower surfaces 124 of the peripheral leads 120 and side faces 142 and lower surfaces 144 of the marks 140 can be changed according to practical applications and are not limited by the text and drawings herein.

In this embodiment, the mark 140 is disposed in a bonding area BA (refer to FIG. 1) of the peripheral area PA, and may be a docking alignment mark (i.e., a mark for aligning a flexible circuit board (not shown) with the touch panel 100 in the step (i.e., the bonding step) of connecting an external circuit board such as the flexible circuit board to the touch panel 100). However, in the present disclosure, no restriction is imposed on a placement position or function of the mark 140. For example, the mark 140 may be any inspection mark, pattern, or label required in a process and is within the scope of protection of the present disclosure. The mark 140 may have any possible shape, such as a circle, a quadrangle, a cross shape, an L shape, or a T shape.

As shown in FIGS. 1A and 1B, in the peripheral area PA, there is a non-conductive area 136 between adjacent peripheral leads 120 to electrically isolate adjacent peripheral leads 120 and avoid short circuit. That is, there are non-conductive areas 136 between side faces 122 of adjacent peripheral leads 120 and between side faces M1L of adjacent first intermediate layers M1. In this embodiment, the non-conductive area 136 is a gap to isolate adjacent peripheral leads 120. In the step of providing the first intermediate layer M1 and the peripheral lead 120, the gap can be made by etching, so the side face 122 of the peripheral lead 120 and the side face M1L of the first intermediate layer M1 are a common etching surface. That is, the side face 122 of the peripheral lead 120 and the side face M1L of the first intermediate layer M1 are formed in the same etching step. Or the side face 122 of the peripheral lead 120 may be etched first, and then the side face M1L of the first intermediate layer M1 is etched. Similarly, the side face 142 of the mark 140 and the side face M2L of the second intermediate layer M2 can also be made in the foregoing manner. In an embodiment, the side face 122 of the peripheral lead 120 and the side face 142 of the mark 140 do not have the metal nanowires 190 due to the foregoing etching step. Further, the peripheral lead 120 and the first intermediate layer M1 have the same or similar patterns and sizes, such as long and straight patterns with the same or similar widths. The mark 140 and the second intermediate layer M2 also have the same or similar patterns and sizes, such as circles with the same or similar radiuses, quadrilaterals with the same or similar side lengths, or other same or similar patterns such as a cross shape, an L shape, and a T shape.

As shown in FIG. 1B, in the display area VA, there is a non-conductive area 136 between adjacent touch sensing electrodes TE to electrically isolate the adjacent touch sensing electrodes TE and avoid short circuit. That is, there is a non-conductive area 136 between side faces of adjacent touch sensing electrodes TE. In this embodiment, the non-conductive area 136 is a gap to isolate adjacent touch sensing electrodes TE. In an embodiment, a gap between adjacent touch sensing electrodes TE can be made by the foregoing etching method. In this embodiment, the touch sensing electrode TE and the first intermediate layer M1 can be made of the same metal nanowire layer NWL (e.g., a silver nanowire layer), so the metal nanowire layer NWL forms the touch sensing electrode TE in the display area VA and forms the first intermediate layer M1 in the peripheral area PA. The touch sensing electrode TE and the first intermediate layer M1 form a connecting structure at an interface between the display area VA and the peripheral area PA, so as to be conductive to the formation of a closed circuit by the touch sensing electrode TE and the peripheral leads 120.

In some embodiments of the present disclosure, the first intermediate layer M1 and the second intermediate layer M2 of the touch panel 100 are disposed on the lower surface 124 of the peripheral lead 120 and the lower surface 144 of the mark 140, respectively, and are formed in the same etching process. Therefore, this can reduce or avoid requirements of setting an alignment error area in a process and reduce a width of the peripheral area PA, thereby meeting requirements for a narrow bezel of a display. Specifically, in some embodiments of the present disclosure, the peripheral leads 120 of the touch panel 100 each have a width of about 5-30 µm and a distance between adjacent peripheral leads 120 is about 5-30 µm or the peripheral leads 120 of the touch panel 100 each have a width of about 3-20 µm and a distance between adjacent peripheral leads 120 is about 3-20 µm. The peripheral area PA may have a width about less than 2 mm, with a frame size reduced by 20% or more compared with that of a conventional touch panel product.

As shown in FIG. 1, the touch sensing electrodes TE are arranged in a non-staggered mode. For example, the touch sensing electrodes TE are strip-shaped electrodes extending in a first direction D1 and varying in width in a second direction D2 and are not staggered with one another. However, in other embodiments, the touch sensing electrodes TE may have appropriate shapes, which should not limit the scope of the present disclosure. In this embodiment, the touch sensing electrodes TE are arranged in a single layer, and a touch position can be obtained by detecting the change of the capacitance value of each touch sensing electrode TE.

Figure 3A:
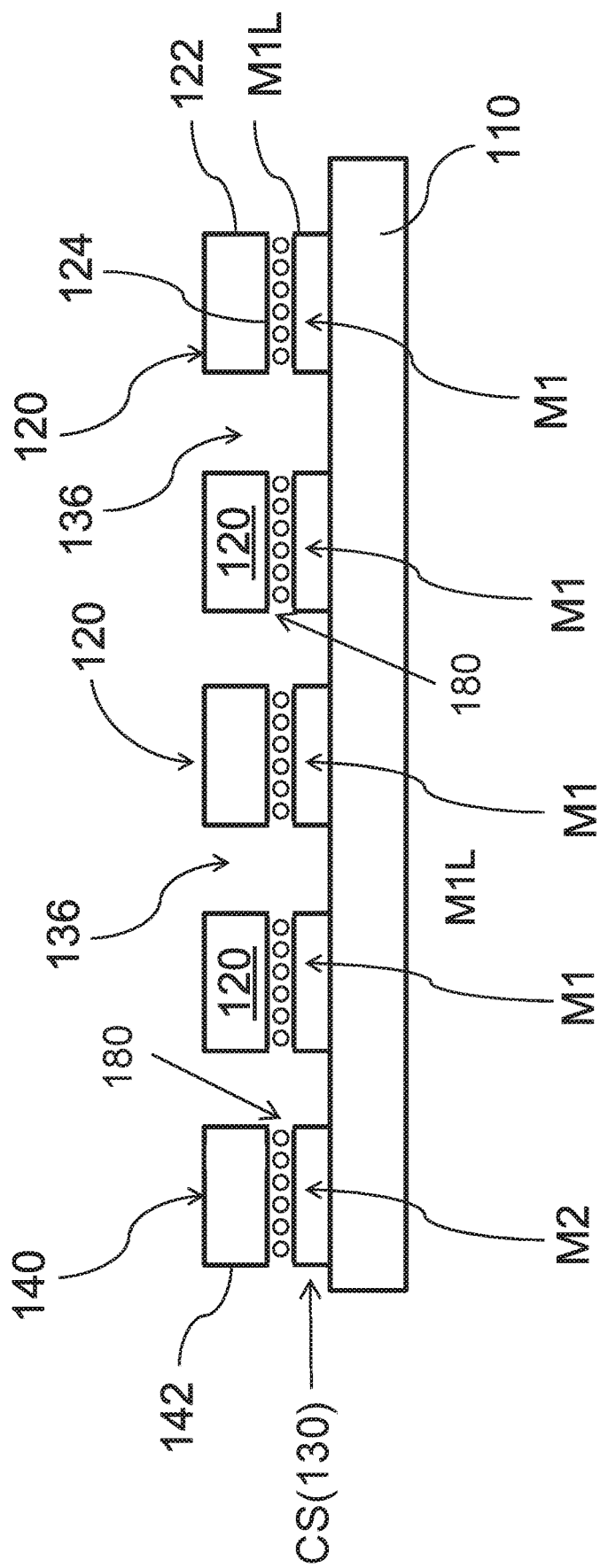
FIG. 3A is a schematic cross-sectional view of a variant embodiment taken along the line A-A of FIG. 1.
Figure 3B:
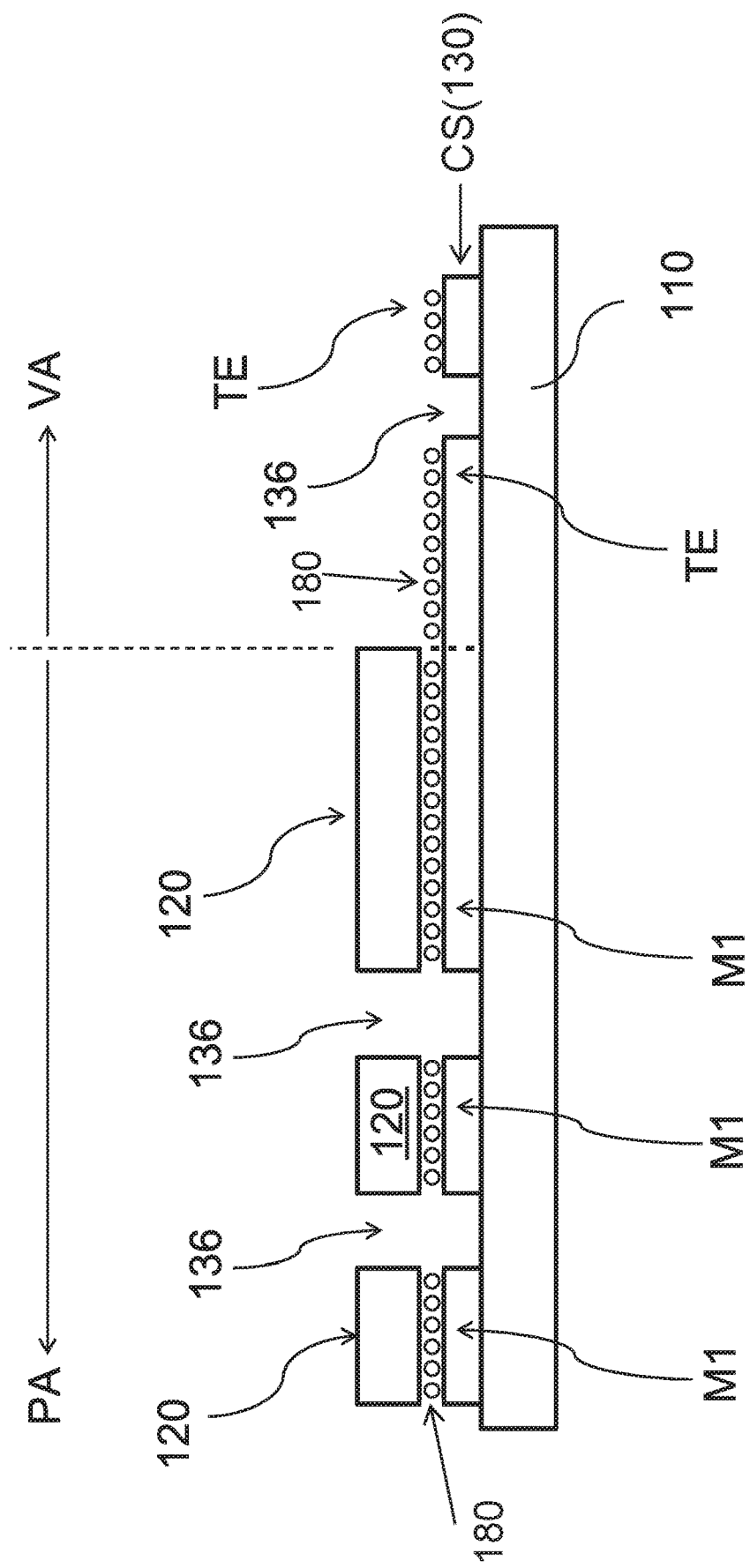
FIG. 3B is a schematic cross-sectional view of a variant embodiment taken along the line B-B of FIG. 1.

In an embodiment, the touch panel 100 may include a film layer 130, and FIGS. 3A and 3B are schematic cross-sectional views after the film layer 130 is formed in the embodiment of FIG. 1, respectively. In an embodiment, the film layer 130 is disposed on the unmodified metal nanowires 190, so that the film layer 130 covers the unmodified metal nanowires 190, and then the modification step and the patterning step are sequentially performed. In a specific embodiment, a polymer of the film layer 130 can penetrate between the metal nanowires 190 before being cured or in a pre-cured state to form a filler. After the polymer is cured, the metal nanowires 190 are embedded into the film layer 130 to form a composite structure CS, and the coating and curing conditions of the polymer are controlled such that a thickness (e.g., less than 100 nm) of the film layer 130 can expose part of the unmodified metal nanowires 190. That is, the unexposed part of the unmodified metal nanowires 190 is embedded in the film layer 130 to form a composite structure CS, and the unmodified metal nanowires 190 may further have an exposed part that is exposed or protruding from the film layer 130. In the subsequent modification step, only the exposed part will be treated by the foregoing method to form the modified metal nanowire 190, while the unmodified metal nanowire 190 embedded in the film layer 130 will maintain its original state without being affected by the modification step. In some embodiments of the present disclosure, the film layer 130 is composed of an insulating material. For example, the material of the film layer 130 may be a non-conductive resin or other organic materials. In some embodiments of the present disclosure, the film layer 130 can be formed by spin coating, spray coating, printing, etc. In some embodiments, the thickness of the film layer 130 is about 20 nm to 10 µm, or 50 nm to 200 nm, or 30 nm to 100 nm. For example, the thickness of the film layer 130 may be about 90 nm or 100 nm.

As shown in FIGS. 3A and 3B, in the peripheral area PA, the exposed metal nanowires 190 exposed or protruding from the film layer 130 have a covering structure 180 due to the modification step. In order to simplify the drawing, the covering structure 180 is provided on an outer side of the film layer 130 in the figure to show that the metal nanowires 190 exposed or protruding from the film layer 130 have a covering structure 180 due to the modification step. In addition, the unmodified metal nanowires 190 embedded in the film layer 130 and the film layer 130 can form a composite structure CS. After the foregoing etching step, the composite structure CS and the modified metal nanowires 190 constitute a first intermediate layer M1 and a second intermediate layer M2. In other words, in this embodiment, the first intermediate layer M1/second intermediate layer M2 has both unmodified metal nanowires 190 (i.e., metal nanowires 190 embedded in the film layer 130) and modified metal nanowires 190 (i.e., metal nanowires 190 exposed out of the film layer 130), while the peripheral leads 120 are mainly in contact with the modified metal nanowires 190 to transmit electrical signals.

As shown in FIG. 3B, in the display area VA, the exposed metal nanowires 190 exposed or protruding from the film layer 130 have a covering structure 180 due to the modification step. In order to simplify the drawing, the covering structure 180 is provided on an outer side of the film layer 130 in the figure to indicate that the exposed metal nanowires 190 exposed or protruding from the film layer 130 have a covering structure 180 due to the modification step. Furthermore, the unmodified metal nanowires 190 embedded in the film layer 130 and the film layer 130 form a composite structure CS. After the foregoing etching step, the composite structure CS and the modified metal nanowires 190 constitute a touch sensing electrode TE. In other words, in this embodiment, the touch sensing electrode TE has both unmodified metal nanowires 190 (i.e., metal nanowires 190 embedded in the film layer 130) and modified metal nanowires 190 (i.e., metal nanowires 190 exposed out of the film layer 130), and the modified metal nanowires 190 are exposed or protrude from the composite structure CS.

In this embodiment, a combined structure of the composite structure CS of the display area VA and the modified metal nanowires 190 preferably has conductivity and light transmission. For example, the light transmission of the touch sensing electrode TE for visible light (e.g., with a wavelength of about 400-700 nm) can be greater than about 80%, and the surface resistance is about 10-1000 ohm/square; or the light transmission of the touch sensing electrode TE for visible light (e.g., with a wavelength of about 400-700 nm) is greater than about 85%, and the surface resistance is about 50-500 ohm/square. In an embodiment, the light transmission of the touch sensing electrode TE for visible light (e.g., with a wavelength of about 400-700 nm) is greater than about 88% or greater than about 90%. In an embodiment, the haze of the touch sensing electrode TE is less than 3.0, 2.5, 2.0, or 1.5.

In some embodiments of the present disclosure, the film layer 130 may be polyethylene (PE), polypropylene (PP), polyvinyl butyral (PVB), polycarbonate (PC), acrylonitrile butadiene styrene (ABS), poly(3,4-ethylenedioxythiophene) (PEDOT), polystyrene sulfonic acid (PSS), or ceramic materials, etc. In an embodiment of the present disclosure, the film layer 130 may be the following polymers, but is not limited to, polyacrylic resin such as polymethacrylate (e.g., poly(methyl methacrylate)), polyacrylate, and polyacrylonitrile; polyvinyl alcohol; polyesters (e.g., polyethylene terephthalate (PET), polyethylene naphthalate, and polycarbonate); polymers with high aromaticity, such as phenolic resin or cresol-formaldehyde, polystyrene, polyvinyl toluene, polyvinylxylene, polyimide, polyamide, polyamideimide, polyetherimide, polysulfide, polysulfone, polyphenylene ether, and poly(phenylene oxide); polyurethane (PU); epoxy resin; polyolefins (such as polypropylene, polymethylpentene, and cycloolefin); cellulose; polysiloxane and other silicon-containing polymers (such as polysilsesquioxane and polysilane); polyvinyl chloride (PVC); polyvinyl acetate; polynorbornene; synthetic rubber (e.g., ethylene-propylene rubber (EPR)) and styrene-butadiene rubber (SBR) and ethylene-propylene-diene monomer (EPDM); fluoropolymers (e.g., polyvinylidene fluoride, polytetrafluoroethylene (TFE), or polyhexafluoropropylene); copolymers of fluoroolefins and hydrocarbon olefins, etc. In other embodiments, inorganic materials such as silica, mullite, alumina, SiC, carbon fiber, $MgO—Al_2O_3—SiO_2$, $Al_2O_3—SiO_2$, or $MgO—Al_2O_3—SiO_2—Li_2O$ can be used.

In some embodiments, the formed metal nanowires 190 may be further post-treated to improve the contact characteristics of the metal nanowires 190 at an intersection (e.g., to increase the contact area), thereby improving conductivity. The post-treatment may include process steps such as heating, plasma, corona discharge, UV ozone, pressure, or a combination of the foregoing processes. For example, after the step of curing to form the metal nanowire layer, a roller can be used to apply pressure to the metal nanowire layer. In one embodiment, a pressure of 50-3400 psi can be applied to the metal nanowire layer by one or more rollers, preferably 100-1000 psi, 200-800 psi, or 300-500 psi can be applied. The above step of applying pressure is preferably performed before the step of coating the film layer 130. In some embodiments, heating and pressure post-treatment can be performed simultaneously. In detail, the formed metal nanowires 190 can be pressed by the one or more rollers and heated at the same time. For example, the pressure applied by the rollers is 10-500 psi, preferably 40-100 psi; at the same time, the rollers are heated to between about 70° C. and 200° C., preferably between about 100° C. and 175° C., which can improve the conductivity of the metal nanowires 190. In some embodiments, the metal nanowires 190 may be preferably exposed to a reducing agent for post-treatment. For example, metal nanowires 190 composed of silver nanowires may be preferably exposed to a silver reducing agent for post-treatment. The silver reducing agent includes a borohydride, such as sodium borohydride; a boron-nitrogen compound, such as dimethylamine borane (DMAB); or a gaseous reducing agent, such as hydrogen ($H_2$). The exposure is performed for about 10 s to about 30 min, and preferably about 1 min to about 10 min. After the foregoing post-treatment step, the contact strength or area of the metal nanowires 190 at the intersection can be enhanced, and it can be better ensured that the contact surface (i.e., the first surface 191) of the metal nanowires 190 at the intersection is not affected by the modification treatment.

Figure 4A:
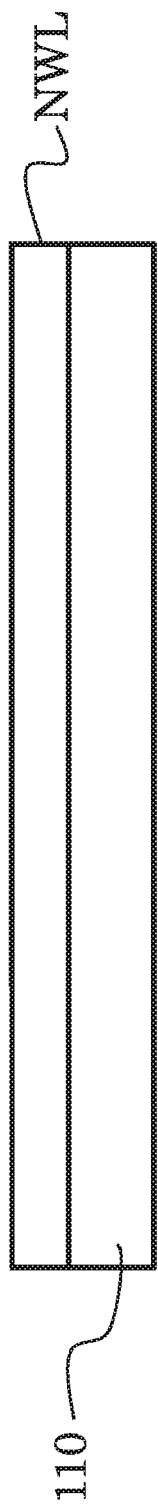
Figure 4B:
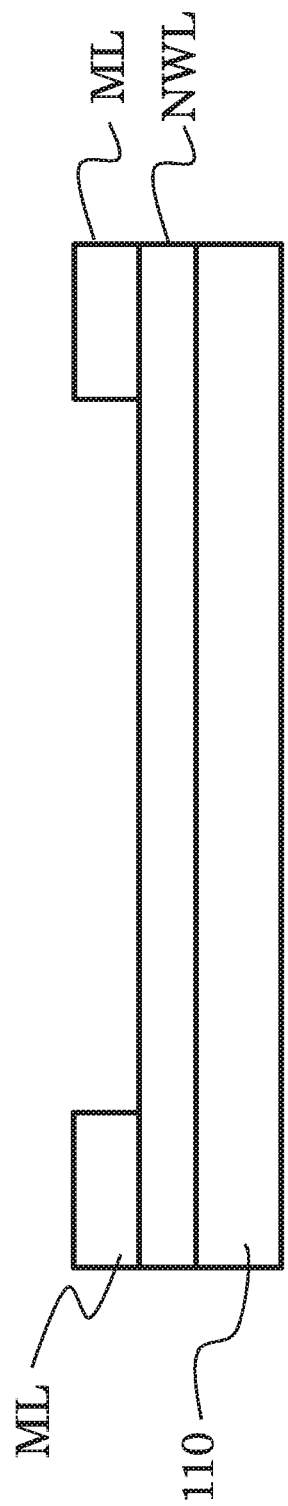
Figure 4D:
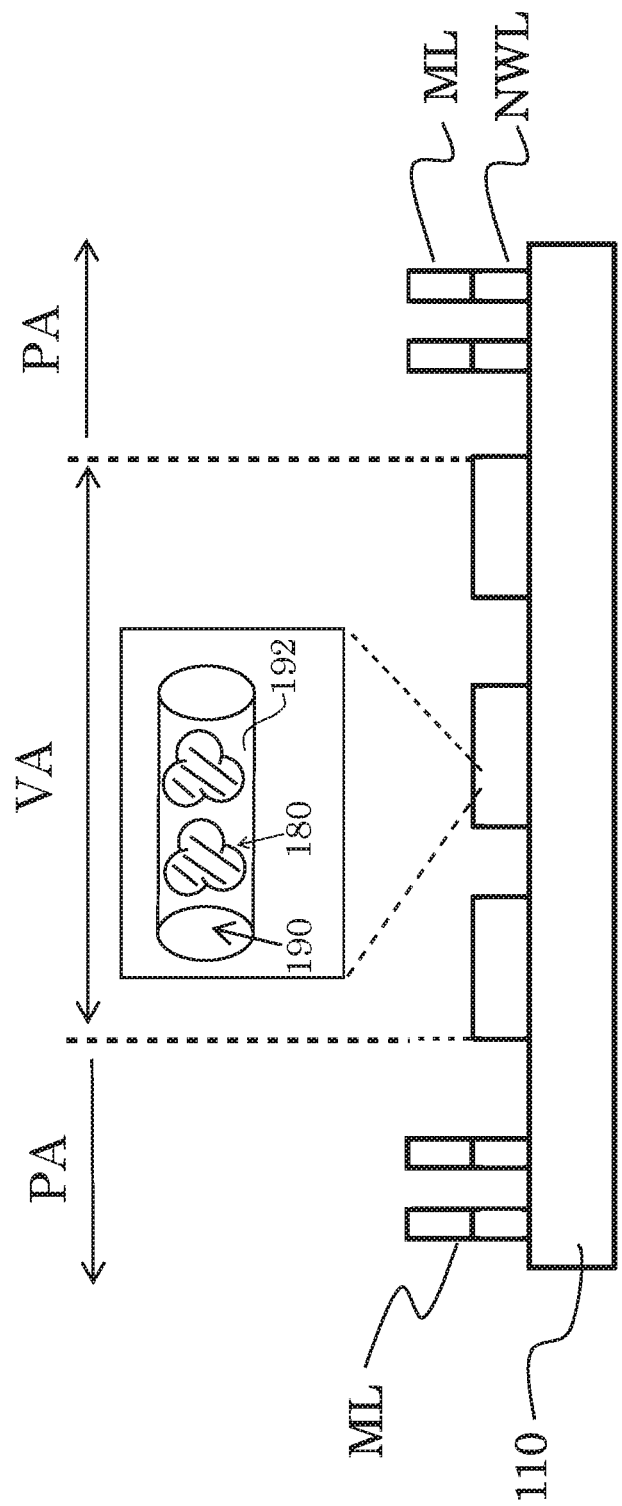

Referring to FIGS. 4A to 4D, the touch panel 100 in another embodiment of the present disclosure can be manufactured by the following method: first a substrate 110 which has a predefined peripheral area PA and display area VA is provided. Next, unmodified metal nanowires 190 are disposed on the substrate 110 to form a metal nanowire layer NWL in the peripheral area PA and the display area VA (as shown in FIG. 4A). The metal nanowires 190 each have a first surface 191 in direct contact with a first surface of another metal nanowire at an intersection and a second surface 192 at a non-intersection. Next, a metal layer ML is formed in the peripheral area PA (as shown in FIG. 4B). Next, patterning is implemented to form a patterned metal layer ML and a metal nanowire layer NWL (as shown in FIG. 4C). Next, a modification step is implemented, and the second surface of each of the modified metal nanowires 190 has a covering structure 180 (as shown in FIG. 4D), wherein the metal nanowire layer NWL located in the display area VA is patterned to form a touch sensing electrode TE. The touch sensing electrode TE is composed of the modified metal nanowires 190 due to the foregoing modification step. The steps in this embodiment are different from those in the foregoing embodiments, but the specific implementations of similar steps can refer to the preceding content, so they will not be repeated here.

Figure 5A:
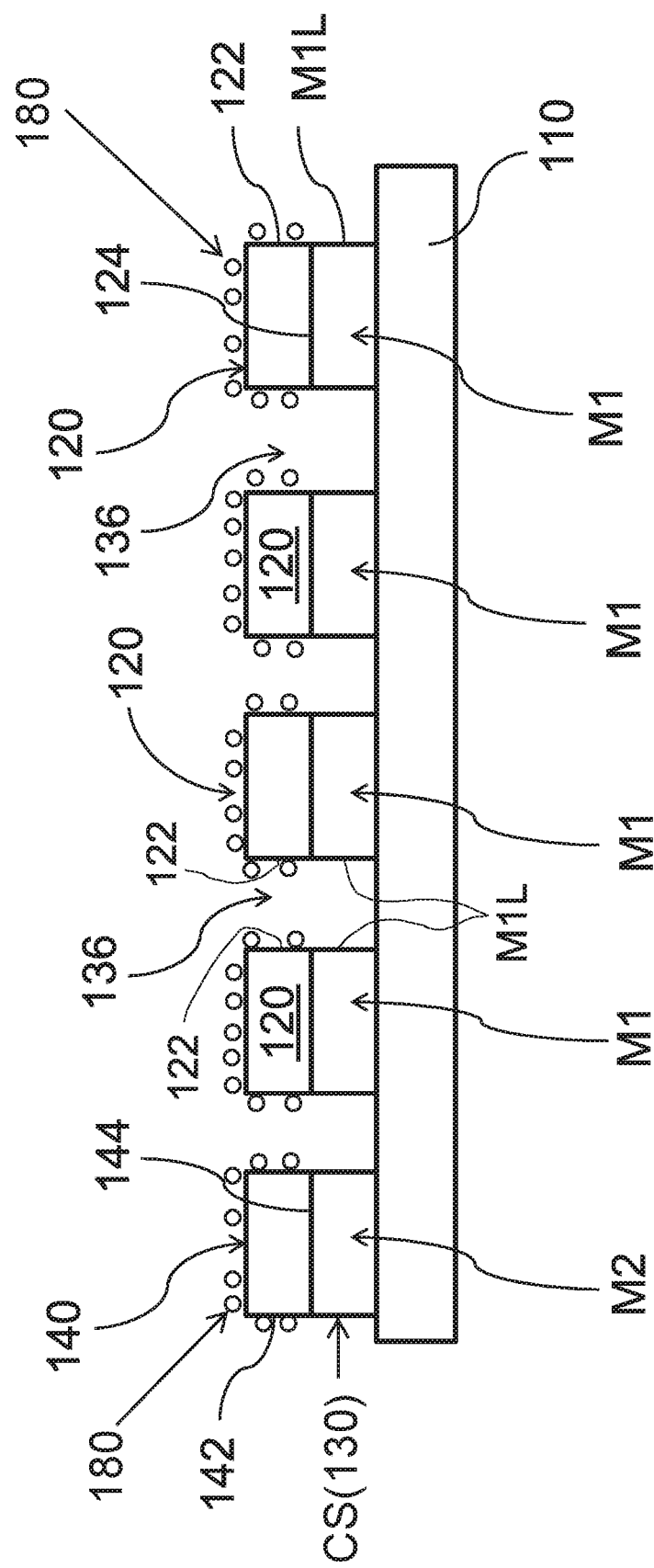
FIG. 5A is a schematic cross-sectional view of another variant embodiment taken along the line A-A of FIG. 1.
Figure 5B:
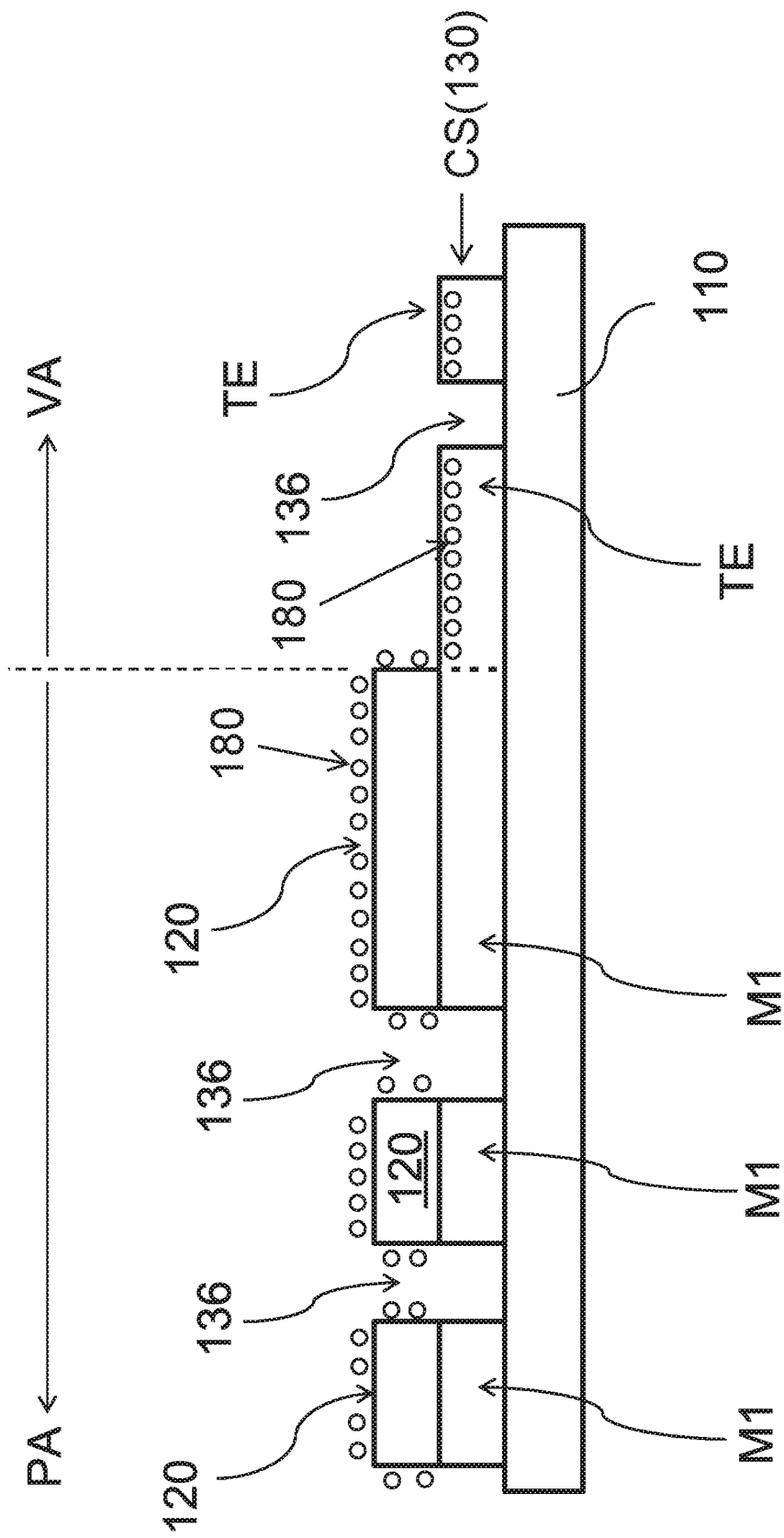
FIG. 5B is a schematic cross-sectional view of another variant embodiment taken along the line B-B of FIG. 1.

The touch panel 100 shown in FIGS. 5A to 5B is the touch panel 100 manufactured according to the steps of this embodiment. In this embodiment, the first intermediate layer M1 and the second intermediate layer M2 may be composed of a metal nanowire layer including at least unmodified metal nanowires 190, such as an unmodified silver nanowire layer, an unmodified modified gold nanowire layer, or an unmodified copper nanowire layer. The touch sensing electrode TE, the first intermediate layer M1, and the second intermediate layer M2 can be made of the same metal nanowire layer NWL, but the metal nanowires 190 of the three have a difference between before and after the modification. For clear description, the touch sensing electrodes TE shown in FIGS. 5A and 5B each have shown a covering structure 180 to represent that the touch sensing electrodes TE are each composed of modified metal nanowires 190. In contrast, the first intermediate layer M1 and the second intermediate layer M2 do not have shown a covering structure 180, which represents that both the first intermediate layer M1 and the second intermediate layer M2 are composed of unmodified metal nanowires 190.

As shown in FIG. 5B, in this embodiment, the touch sensing electrode TE is mainly disposed in the display area VA, and can be electrically connected to the peripheral leads 120. Similar to the previous embodiment, the touch sensing electrode TE may be a metal nanowire layer NWL including at least the modified metal nanowires 190. That is, the metal nanowire layer in the display area VA is first patterned and then modified to form the touch sensing electrode TE.

As shown in FIGS. 5A and 5B, since the modification step is implemented after the patterning step, the first intermediate layer M1 is formed by the unmodified metal nanowire 190 and disposed on a lower surface 124 of the peripheral lead 120, and the first intermediate layer M1 is located between the lower surface 124 and the substrate 110. The second intermediate layer M2 is formed by the unmodified metal nanowires 190 and disposed on a lower surface 144 of the mark 140, and the second intermediate layer M2 is located between the lower surface 144 and the substrate 110. Furthermore, a covering structure 180 can be formed on the exposed surface of the peripheral lead 120 by the modification step. For example, the covering structure 180 is formed on an upper surface and a side face 122 of the peripheral lead 120. Similarly, a covering structure 180 can be formed on the exposed surface of the mark 140 by the modification step. For example, the covering structure 180 is formed on an upper surface and a side face 142 of the mark 140.

In an embodiment, the covering structure 180 may also be formed on a side face M1L of the first intermediate layer M1 or a side face M2L of the second intermediate layer M2.

In an embodiment, the peripheral area PA may be shielded by a shielding material first, so that the covering structure 180 is only formed in the display area VA. In other words, the foregoing modification step is implemented only in the display area VA. Alternatively, a removal step may be performed to remove the covering structure 180 formed on the upper surface and side face 122/142 of the peripheral lead 120/mark 140.

Figure 6A:
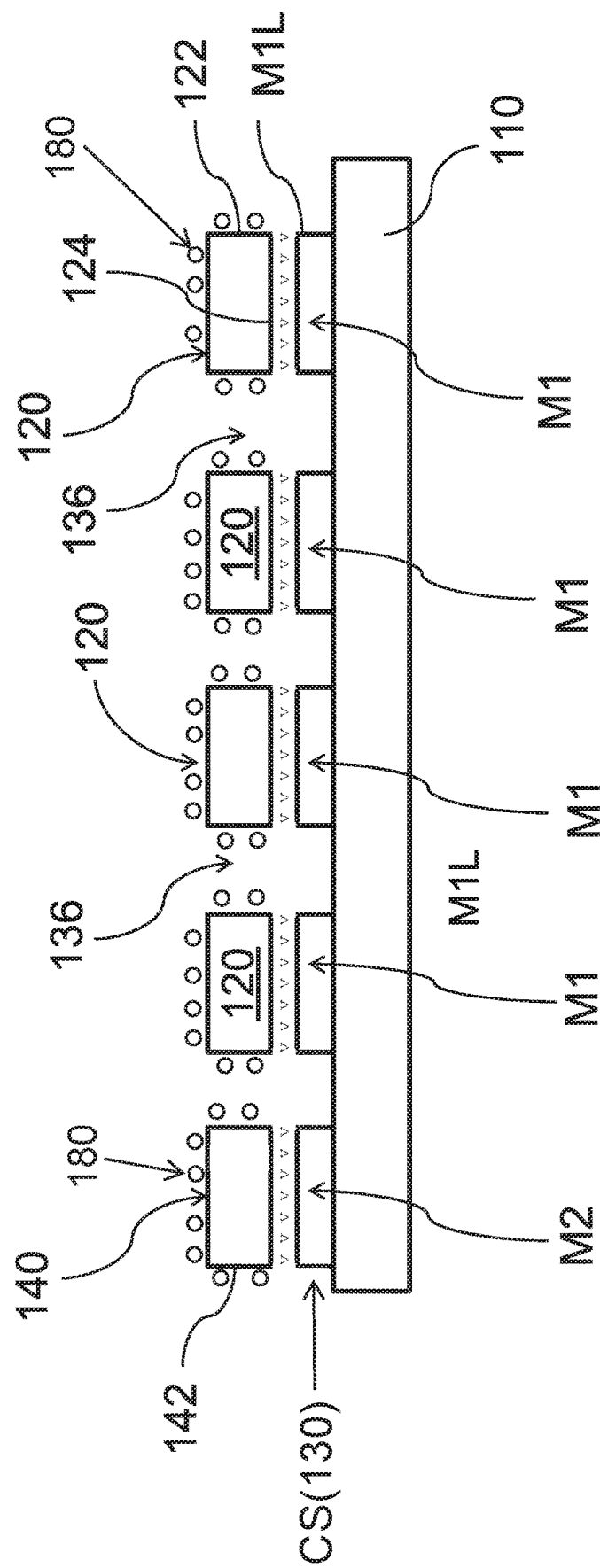
FIG. 6A is a schematic cross-sectional view of another variant embodiment taken along the line A-A of FIG. 1.
Figure 6B:
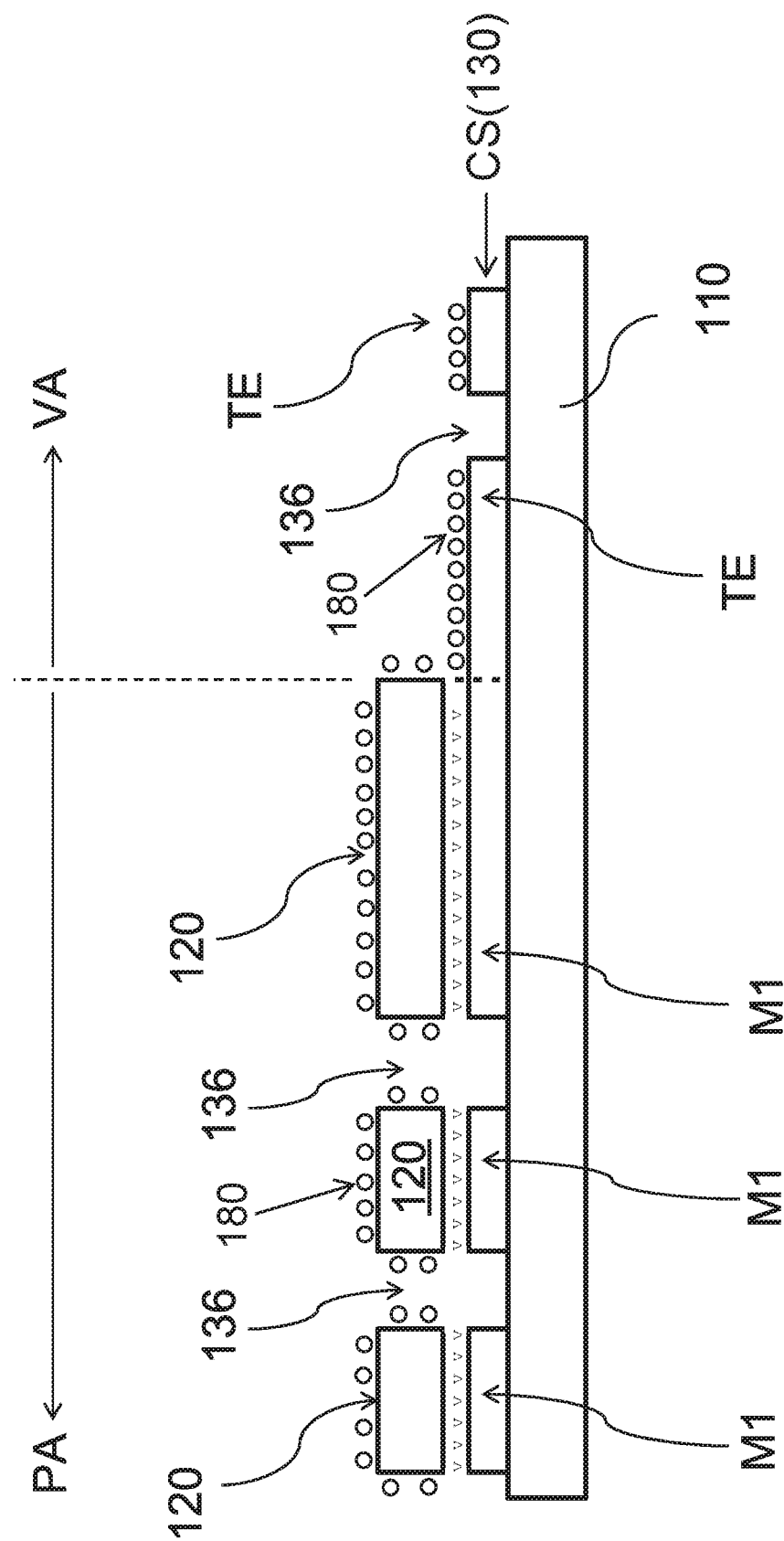
FIG. 6B is a schematic cross-sectional view of another variant embodiment taken along the line B-B of FIG. 1.

In an embodiment, the touch panel 100 may include a film layer 130, and FIGS. 6A and 6B are schematic cross-sectional views after the film layer 130 is formed in the foregoing embodiment, respectively. In an embodiment, the film layer 130 is disposed on the unmodified metal nanowires 190, so that the film layer 130 covers the unmodified metal nanowires 190, and then the foregoing patterning step and modification step are sequentially performed. In a specific embodiment, a polymer of the film layer 130 can penetrate between the metal nanowires 190 before being cured or in a pre-cured state to form a filler. After the polymer is cured, the metal nanowires 190 are embedded into the film layer 130 to form a composite structure CS, and the coating and curing conditions of the polymer are controlled such that a thickness (e.g., less than 100 nm) of the film layer 130 can expose part of the unmodified metal nanowires 190. That is, the unexposed part of the unmodified metal nanowires 190 is embedded in the film layer 130 to form a composite structure CS, while the unmodified metal nanowires 190 have an exposed part that is exposed or protruding from the film layer 130. In the subsequent modification step, only the exposed part located in the display area VA will be treated by the foregoing method to form the modified metal nanowire 190, while the unmodified metal nanowire 190 embedded in the film layer 130 and the exposed part located in the peripheral area PA will maintain its original state without being affected by the modification step.

As shown in FIG. 6B, in the display area VA, the exposed metal nanowires 190 exposed or protruding from the film layer 130 have a covering structure 180 due to the modification step. In order to simplify the drawing, the covering structure 180 is provided on an outer side of the film layer 130 in the figure to indicate that the exposed metal nanowires 190 exposed or protruding from the film layer 130 have a covering structure 180 due to the modification step. Furthermore, the unmodified metal nanowires 190 embedded in the film layer 130 and the film layer 130 form a composite structure CS. The composite structure CS and the modified metal nanowires 190 constitute a touch sensing electrode TE. In other words, in this embodiment, the touch sensing electrode TE has both unmodified metal nanowires 190 (i.e., metal nanowires 190 embedded in the film layer 130) and modified metal nanowires 190 (i.e., metal nanowires 190 exposed out of the film layer 130), and the modified metal nanowires 190 of the touch sensing electrode TE are exposed or protrude from the composite structure CS.

As shown in FIGS. 6A and 6B, in the peripheral area PA, the exposed metal nanowires 190 exposed or protruding from the film layer 130 are not affected by the modification step because they are covered by the peripheral leads 120, so the exposed metal nanowires 190 exposed or protruding from the film layer 130 do not have the covering structure 180. In the figure, "V" represents the unmodified metal nanowires 190 exposed or protruding from the film layer 130. The unmodified metal nanowires 190 embedded in the film layer 130 and the film layer 130 form a composite structure CS. The unmodified metal nanowires 190 exposed or protruding from the film layer 130 and the composite structure CS can constitute a first intermediate layer M1 and a second intermediate layer M2. In other words, in this embodiment, the metal nanowires 190 constituting the first intermediate layer M1/the second intermediate layer M2 are all unmodified metal nanowires 190. No matter whether it is the metal nanowire 190 embedded in the film layer 130 or the metal nanowire 190 exposed out of the film layer 130, the peripheral leads 120 are mainly in contact with the unmodified metal nanowires 190 exposed out of the film layer 130 to transmit electrical signals. Furthermore, a covering structure 180 can be formed on the exposed surface of the peripheral lead 120/the mark 140 by the modification step. For example, the covering structure 180 is formed on an upper surface and a side face 122/142 of the peripheral lead 120/mark 140.

In an embodiment, the covering structure 180 may also be formed on a side face of the composite structure CS.

Figure 7:
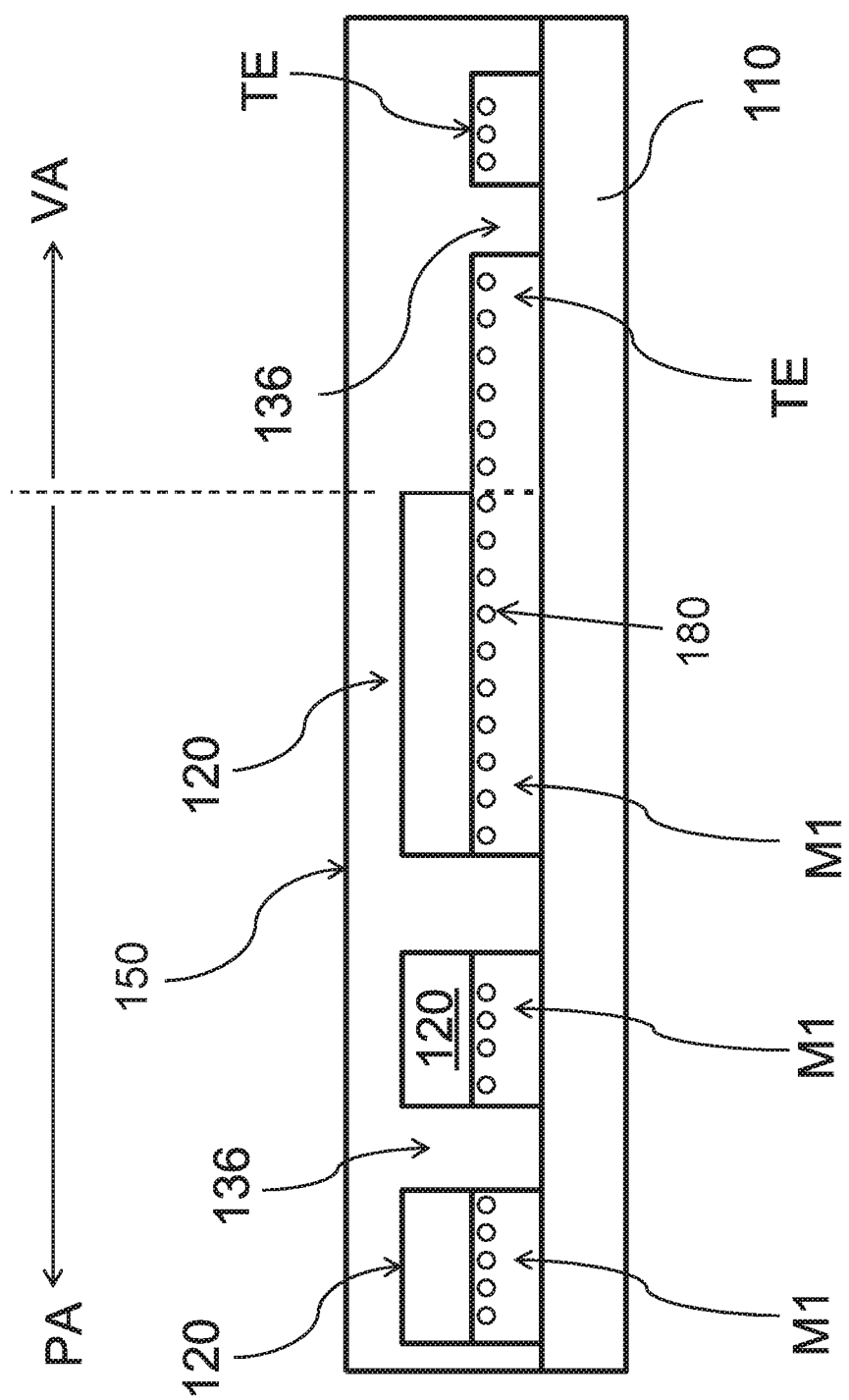
FIG. 7 is a schematic cross-sectional view of a touch panel according to another embodiment of the present disclosure.

In an embodiment, the touch panel 100 may further include a protective layer 150, which can be applied to various embodiments, and only the embodiment shown in FIG. 1B is taken as an example. FIG. 7 shows a schematic cross-sectional view of the embodiment in which the protective layer 150 is formed in FIG. 1B. It should be noted that the material of the protective layer 150 can refer to an example materials of the film layer 130 described above. In an embodiment, the protective layer 150 entirely covers the touch panel 100. That is, the protective layer 150 covers the touch sensing electrode TE, the peripheral leads 120, and the marks 140. The protective layer 150 may fill the non-conductive area 136 between adjacent peripheral leads 120 to isolate adjacent peripheral leads 120, or the protective layer 150 may fill the non-conductive area 136 between adjacent touch sensing electrodes TE to isolate the adjacent touch sensing electrodes TE. In addition, for a single group of corresponding peripheral leads 120 and first intermediate layer M1, the protective layer 150 surrounds the single group of vertically corresponding peripheral leads 120 and first intermediate layer M1. Similarly, for a single group of corresponding marks 140 and second intermediate layer M2, the protective layer 150 surrounds the single group of vertically corresponding marks 140 and second intermediate layer M2.

Figure 8:
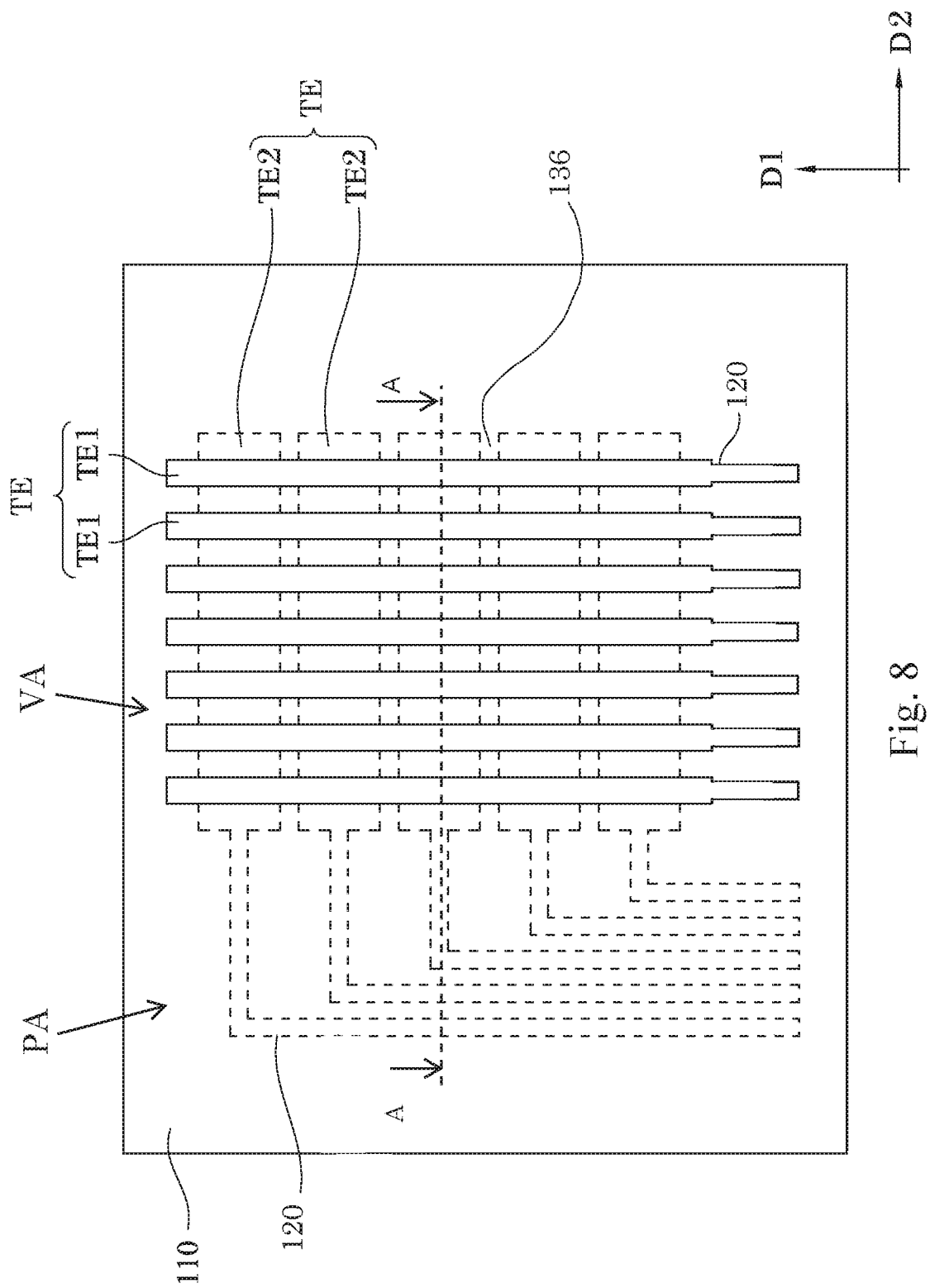
FIG. 8 is a schematic top view of a touch panel according to another embodiment of the present disclosure.
Figure 8A:
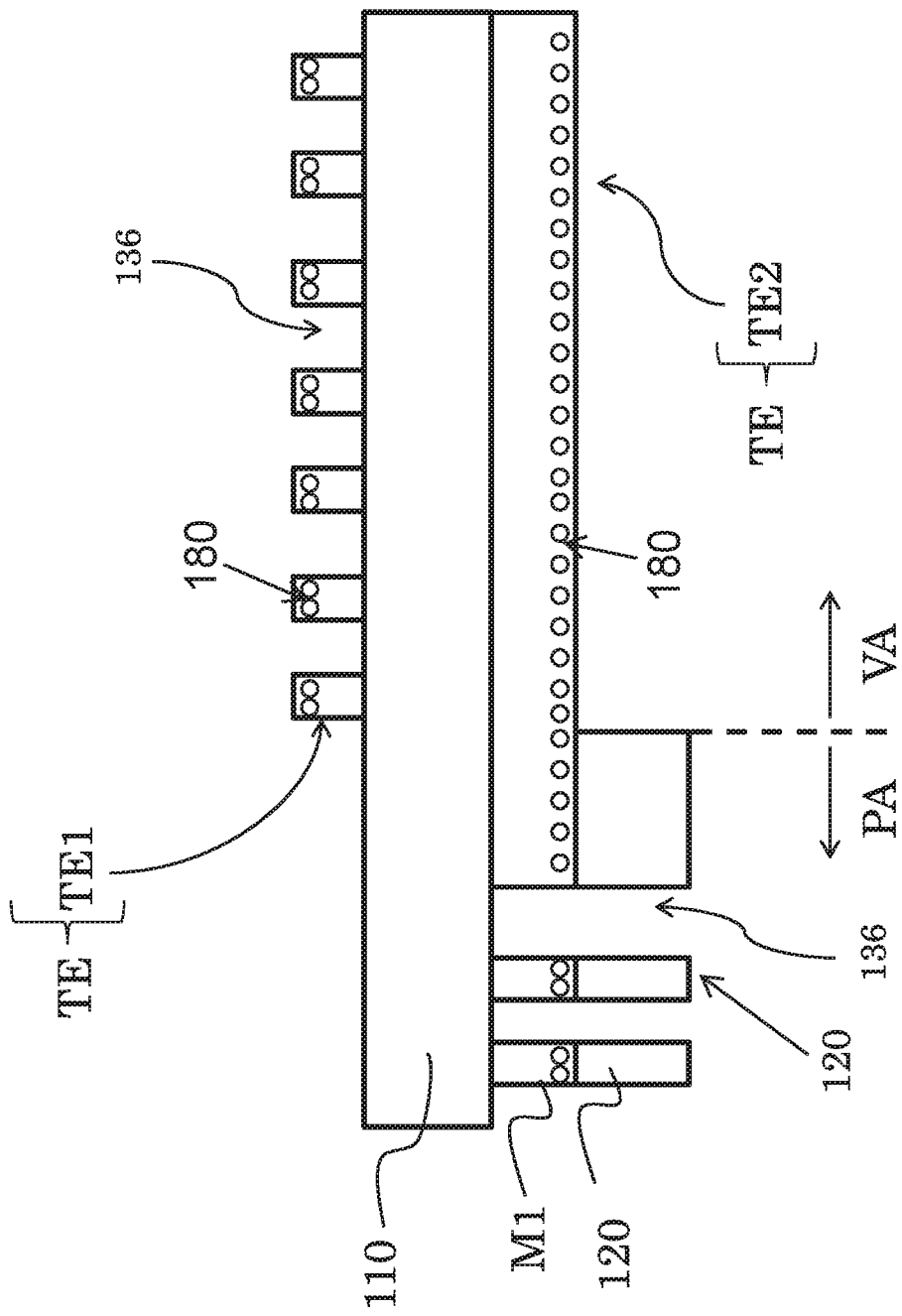
FIG. 8A is a schematic cross-sectional view taken along a line A-A of FIG. 8.

FIG. 8 is a schematic top view of a touch panel 100 according to some embodiments of the present disclosure. In this embodiment, the touch sensing electrodes TE have a double-layer configuration. FIG. 8A is a cross-sectional view taken along a line A-A of FIG. 8.

For convenience of explanation, the configuration in this embodiment is explained with the first touch electrode TE1 and the second touch electrode TE2. The first touch electrode TE1 is formed on a surface (such as an upper surface) of the substrate 110, and the second touch electrode TE2 is formed on the other surface (such as a lower surface) of the substrate 110, so that the first touch electrode TE1 and the second touch electrode TE2 are electrically insulated from one another. The peripheral leads 120 electrically connected to the first touch electrode TE1 cover the first intermediate layer M1. In the same way, the peripheral leads 120 connected to the second touch electrode TE2 cover the corresponding first intermediate layer M1. The first touch electrode TE1 are a plurality of strip-shaped electrodes arranged in a first direction D1, and the second touch electrodes TE2 are a plurality of strip-shaped electrodes arranged in a second direction D2. As shown in the figure, the strip-shaped touch sensing electrodes TE1 and the strip-shaped touch sensing electrodes TE2 extend in different directions and are staggered with one another. The first touch sensing electrodes TE1 and the second touch sensing electrodes TE2 can be used for transmitting control signals and receiving touch sensing signals, respectively. In this way, the touch position can be obtained by detecting the signal change (e.g., capacitance change) between the first touch sensing electrodes TE1 and the second touch sensing electrodes TE2. Through such an arrangement, the user can perform touch sensing at various points on the substrate 110. As with the foregoing embodiment, the first touch sensing electrode TE1 and/or the second touch sensing electrode TE2 can be made of at least the modified metal nanowires 190, and the first intermediate layer M1 can be made of the modified metal nanowires 190. In other embodiments, the first intermediate layer M1 or the second intermediate layer M2 can be made of the modified or unmodified metal nanowires 190 according to the foregoing method, and a covering structure 180 can be formed on the outer surface of the peripheral lead 120 or the mark 140 according to the foregoing method.

The two-sided touch panel manufactured in the embodiment of the present disclosure can be manufactured by the following method: first a substrate 110 which has a predefined peripheral area PA and display area VA is provided. Next, metal nanowire layers NWL are respectively formed on the opposite first and second surfaces (such as the upper surface and the lower surface) of the substrate 110, such that the metal nanowire layers NWL are in the peripheral area PA and the display area VA of the first surface and the second surface. Next, a modification step is implemented, so that a covering structure 180 (except the contact surface at the intersection) is formed on the metal nanowires 190 on the upper and lower surfaces of the substrate 110. Next, a metal layer ML is formed on the first surface and the second surface of the substrate 110, and the metal layer ML is located in the peripheral area PA. Next, the metal nanowire layer NWL and the metal layer ML on the first surface and the second surface are respectively patterned to form the first touch electrode TE1, the second touch electrode TE2, and the peripheral leads 120 on the first surface and the second surface, and the peripheral leads 120 cover the first intermediate layer M1.

As with the foregoing embodiments, any surface (such as the upper surface or the lower surface) of the substrate 110 may further include a mark 140 and a second intermediate layer M2.

It should be noted that all the embodiments of this specification can be applied to double-sided touch panels, and are not limited to the implementation methods exemplified in the preceding content.

According to the method for manufacturing a double-sided touch panel in the embodiment of the present disclosure, the double-sided touch panel can be formed by laminating two groups of single-sided touch panels in the same direction or opposite directions. Taking the reverse direction lamination as an example, the touch electrodes of the first group of single-sided touch panels can be set upward (for example, closest to the user but not limited to this), while the touch electrodes of the second group of single-sided touch panels are set downward (for example, farthest from the user but not limited to this), and the substrates of the two groups of touch panels are assembled and fixed by an optical adhesive or other similar adhesives, thereby forming a double-sided touch panel.

Figure 9:
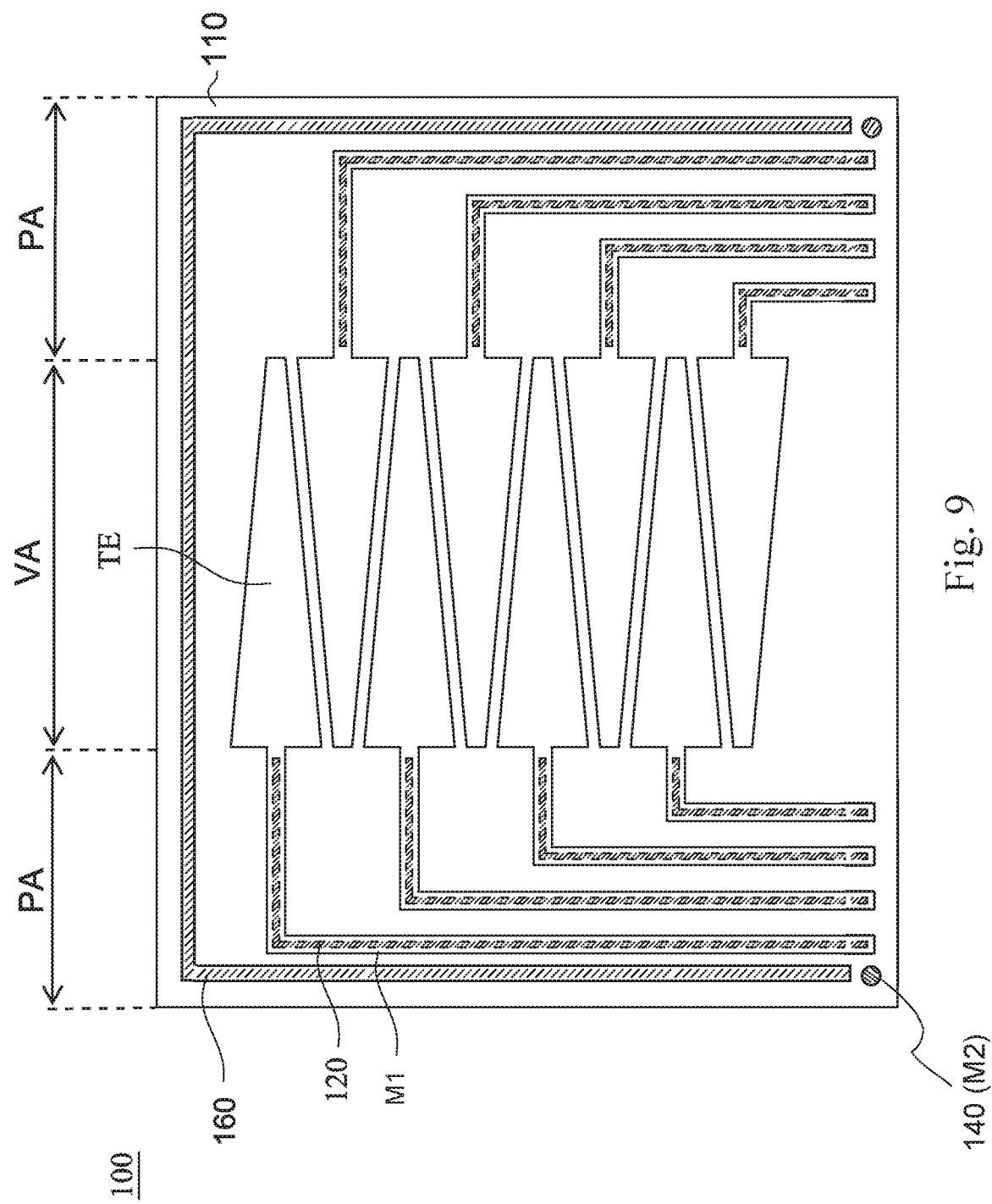
FIG. 9 is a schematic top view of a touch panel according to another embodiment of the present disclosure.

FIG. 9 is a schematic top view of a touch panel 100 according to some embodiments of the present disclosure. In this embodiment, the touch panel 100 further includes a shielded wire 160 disposed in the peripheral area PA. The shielded wire 160 mainly surrounds the touch sensing electrode TE and the peripheral lead 120; and the shielded wire 160 extends to the bonding area and is electrically connected to a grounding terminal of a flexible circuit board, so the shielded wire 160 can shield or eliminate the signal interference or electrostatic discharge (ESD) protection, especially a slight current change caused by the human hand touching a connecting wire around a touch device.

The shielded wire 160 can be made of a metal material, and it is preferable to refer to the description of the peripheral lead 120 or the mark 140. A third intermediate layer is provided between the shielded wire 160 and the substrate 110 and is made of modified or unmodified metal nanowires 190. For specific embodiments, refer to the description of the first intermediate layer M1 or the second intermediate layer M2. In some embodiments of the present disclosure, the shielded wire 160, the peripheral leads 120, and the marks 140 may be made of the same metal layer ML (i.e., the three are made of the same metal material). The touch sensing electrode TE, the third intermediate layer M3, the first intermediate layer M1, and the second intermediate layer M2 may be made of the same metal nanowire layer NWL (such as a silver nanowire layer). The metal nanowires 190 can be modified according to the foregoing process to have a covering structure 180, and the specific method can refer to the foregoing implementation method, and will not be described in detail here.

Figure 10:
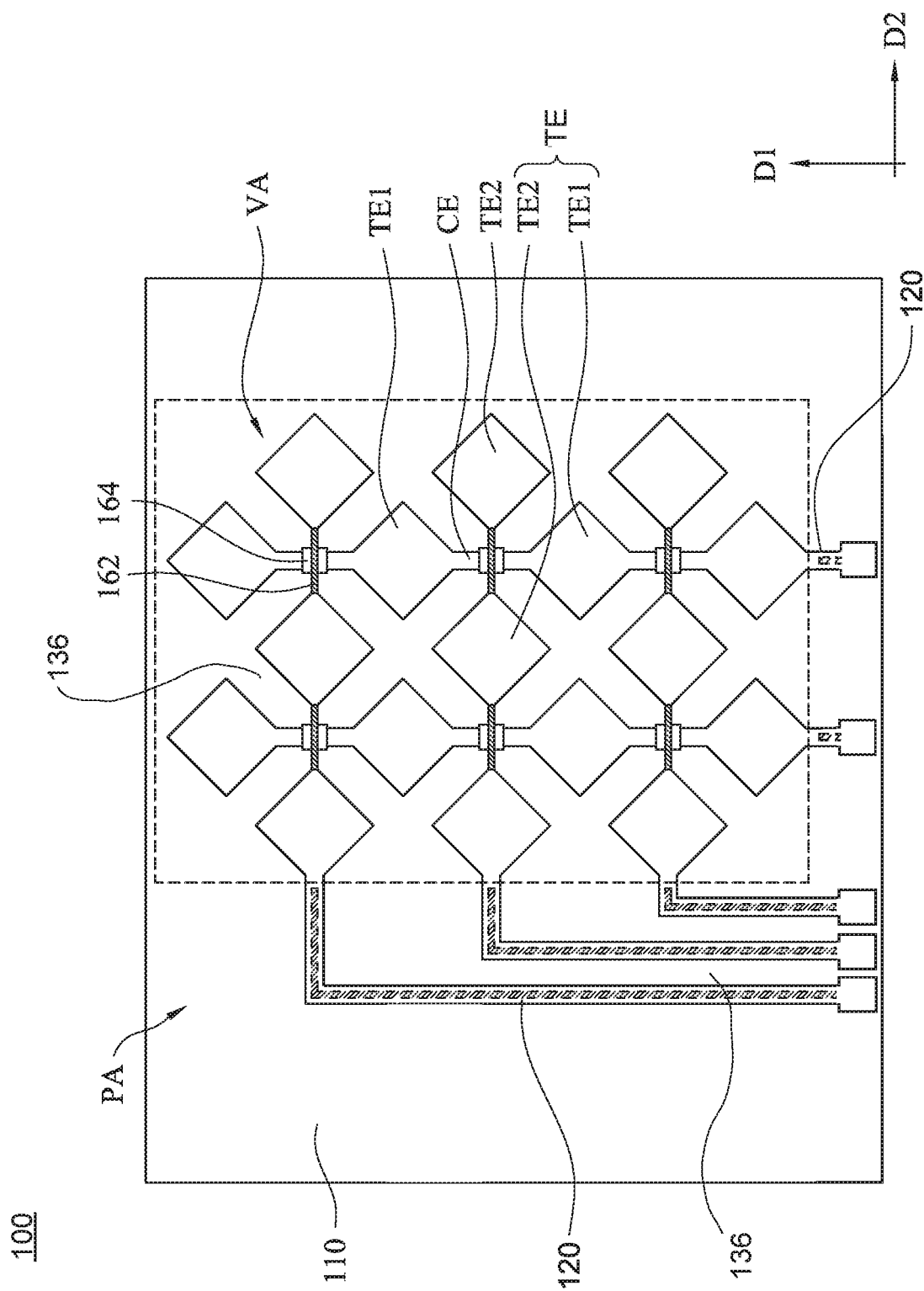
FIG. 10 is a schematic view of a touch panel according to another embodiment of the present disclosure.

FIG. 10 shows another embodiment of a single-sided touch panel 100 of the present disclosure, which is a single-sided bridge touch panel. This embodiment differs from the foregoing embodiment in at least that touch sensing electrodes TE formed by a transparent conductive layer (i.e., a metal nanowire layer 140A) formed on the substrate 110 after the foregoing patterning step may include first touch sensing electrodes TE1 arranged in a first direction D1, second touch sensing electrodes TE2 arranged in a second direction D2, and connecting electrodes CE electrically connecting two adjacent first touch sensing electrodes TE1. That is, the first touch sensing electrodes TE1, the second touch sensing electrodes TE2, and the connecting electrodes CE are made of modified or unmodified metal nanowires 190. In addition, an insulating block 164 may be disposed on the connecting electrode CE. For example, the insulating block 164 is formed by silicon dioxide. Bridging wires 162 are disposed on the insulating block 164. For example, the bridging wires 162 are made of copper, ITO, and/or metal nanowires or other materials. The bridging wires 162 are connected to two adjacent second touch sensing electrodes TE2 in the second direction D2. The insulating block 164 is located between the connecting electrode CE and the bridge wires 162 to electrically isolate the connecting electrode CE and the bridge wires 162, so that the touch electrodes in the first direction D1 and the second direction D2 are electrically isolated from one another. Refer to the above for specific methods, which will not be repeated here.

In some embodiments, the touch panel 100 described herein can be manufactured by a roll-to-roll coating process. The roll-to-roll coating process uses conventional equipment and can be fully automated, which can significantly reduce the cost of manufacturing the touch panel. The specific process of the roll-to-roll coating is as follows: first a flexible substrate 110 is selected, the rolled tape-shaped substrate 110 is installed between two rollers, and the rollers are driven by a motor, so that the substrate 110 can be continuously processed along a motion path between the two rollers. For example, ink including metal nanowires 190 is deposited on the surface of the substrate 110 by using a storage tank, a spraying device, a brushing device, and a similar device to form the metal nanowires 190. A polymer is deposited on the surface of the substrate 110 by using a spray head, the polymer is cured into a film layer 130, and patterning and modification and other steps are implemented. Then, the finished touch panel 100 is rolled out by the roller at the last end of a production line to form a touch sensor tape.

The touch sensor tape of this embodiment can further include the foregoing protective layer 150, which entirely covers uncut touch panels 100 on a touch sensor roll. That is, the protective layer 150 can cover a plurality of uncut touch panels 100 on the touch sensor roll, and then the touch panels 100 are cut and separated into individual touch panels 100.

In some embodiments of the present disclosure, the substrate 110 is preferably a transparent substrate. In detail, the substrate 110 may be a hard transparent substrate or a flexible transparent substrate, and the material of the substrate 110 can be selected from glass, polymethyl methacrylate (PMMA), polyvinyl chloride (PVC), polypropylene (PP), polyethylene terephthalate (PET), polyethylene naphthalate (PEN), polycarbonate (PC), polystyrene (PS), cyclo olefin polymers (COP), colorless polyimide (CPI), cycloolefin copolymer (COC), and other transparent materials. In order to improve the adhesion between the substrate 110 and the metal nanowires 190, the substrate 110 may be preferably subjected to pretreatment steps (e.g., a surface modification process is implemented), or the surface of the substrate 110 is additionally coated with an adhesive layer or resin layer.

In some embodiments of the present disclosure, the metal nanowires 190 may be silver nanowires or silver nanofibers, may have an average diameter of about 20 nm to 100 nm and an average length of about 20 μm to 100 μm. The metal layer (such as protective glass) by the optical adhesive. The touch panel of the embodiment of the present disclosure can be applied to electronic devices such as portable telephones, tablet computers, and notebook computers.

Other details of this embodiment are roughly as described in the foregoing embodiments, and will not be repeated here.

The structures of different embodiments of the present disclosure can be referred to one another, which is limited by the foregoing specific embodiments.

In some embodiments of the present disclosure, the metal nanowires 190 are modified without affecting the direct contact state between the metal nanowires 190, so the conductive characteristics of the electrode formed by the metal nanowires 190 can be maintained and the modified metal nanowires 190 can have better optical characteristics than before modification.

In some embodiments of the present disclosure, the haze of the modified metal nanowires 190 can be reduced by more than 10% compared with that before the modification. Compared with that before modification, the conductivity of the modified metal nanowires 190 is not affected. For example, but not limitation, the change of resistance (equivalent to conductivity) is below 5%. Compared with that before modification, the light transmission of the modified metal nanowires 190 is not affected. For example, but not limitation, the change of light transmittance is below 5%, or below 1%, or below 0.5%, or the light transmittance before and after treatment is the same.

In some embodiments of the present disclosure, the silver nanowires are coated with a palladium material having a blackening effect, so that the reflectivity of the silver nanowires can be effectively reduced, thereby reducing the haze. The following table is a description of specific embodiments.

| Treatment time | Before treatment | | | After treatment | | | Difference between before and after treatment | | |
|---|---|---|---|---|---|---|---|---|---|
| | T | H | R | T | H | R | ΔT | ΔH | ΔR |
| 30 s | 90.6 | 3.09 | 15.78 | 90.8 | 3.08 | 16.11 | 0.2 | −0.5% | 2.11% |
| 1 min | 90.1 | 3.46 | 12.80 | 90.3 | 3.42 | 13.01 | 0.2 | −1.6% | 1.62% |
| 2 min | 89.4 | 3.93 | 13.65 | 89.6 | 3.84 | 14.27 | 0.2 | −4.7% | 4.54% |
| 5 min | 91 | 3.03 | 16.05 | 91 | 2.82 | 18.90 | 0 | −10.3% | 4.86% |

Note:
T denotes light transmission (%), H denotes haze, R denotes sheet resistance (ohm/square), and Δ denotes a difference between before and after treatment.

nanowires preferably have an average diameter of about 20 nm to 70 nm and an average length of about 20 μm to 70 μm (i.e., an aspect ratio is 1000). In some embodiments, the metal nanowires 190 can each have a diameter of 70-80 nm and a length of about 8 μm.

A roll-to-roll production line can adjust the sequence of multiple coating steps along a motion path of the substrate as required or can incorporate any number of additional stations as required. For example, in order to achieve a proper post-treatment process, pressure rollers or plasma equipment can be installed in the production line.

The touch panel of the embodiment of the present disclosure can be assembled with other electronic devices, such as a display with a touch function. For example, the substrate 110 can be attached to a display component, such as a liquid crystal display component or an organic light emitting diode (OLED) display component, and the two can be glued with an optical adhesive or other similar adhesives. The touch sensing electrode TE can also be glued to an outer cover In some embodiments of the present disclosure, the lower surfaces of the marks 140 and/or the peripheral leads 120 are covered by the first intermediate layers M1 or second intermediate layer M2 formed by the metal nanowires 190. This can avoid an alignment error area reserved in the alignment process, so the width of the peripheral area can be effectively reduced.

Although the present disclosure has been disclosed as above in terms of multiple embodiments, it is not intended to limit the present disclosure. Any person skilled in the art can make various changes and modifications without departing from the spirit and scope of the present disclosure. Therefore, the protection scope of the present disclosure shall be subject to the scope defined in the appended claims.

What is claimed is:
1. A touch panel, comprising:
 a substrate, wherein the substrate has a display area and a peripheral area;

a plurality of peripheral leads disposed in the peripheral area of the substrate;

a plurality of first intermediate layers disposed between the peripheral leads and the substrate; and a touch sensing electrode disposed in the display area of the substrate and electrically connected with the peripheral leads, wherein the touch sensing electrode comprises a plurality of modified metal nanowires, the modified metal nanowires have first surfaces in direct contact with each other at an intersection, the modified metal nanowires have second surfaces with covering structures, and the second surfaces are at a non-intersection.

2. The touch panel of claim 1, wherein the first intermediate layers comprise the modified metal nanowires.

3. The touch panel of claim 1, wherein the first intermediate layers comprise a plurality of unmodified metal nanowires, and outer surfaces of the peripheral leads are each provided with the covering structure.

4. The touch panel of claim 1, further comprising: a film layer, wherein the modified metal nanowires are exposed on the film layer.

5. The touch panel of claim 4, wherein the touch sensing electrode further comprises a plurality of unmodified metal nanowires disposed in the film layer.

6. The touch panel of claim 1, wherein the covering structures are at least one of a layered structures, island-shaped protrusion structures, or point-shaped protrusion structures which are made of a conductive material.

7. The touch panel of claim 6, wherein the conductive material is silver, gold, copper, platinum, iridium, rhodium, palladium, or osmium.

8. The touch panel of claim 6, wherein the conductive material is graphene, carbon nanotubes, conductive polymers, or conductive oxides.

* * * * *